(12) United States Patent
Hadano

(10) Patent No.: US 8,289,545 B2
(45) Date of Patent: Oct. 16, 2012

(54) MONITORING SYSTEM, IMAGE PROCESSING APPARATUS, AND METHOD FOR REQUEST PROCESSING

(75) Inventor: Masahiro Hadano, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 721 days.

(21) Appl. No.: 12/253,794

(22) Filed: Oct. 17, 2008

(65) Prior Publication Data

US 2009/0103131 A1    Apr. 23, 2009

(30) Foreign Application Priority Data

Oct. 19, 2007 (JP) ................................ 2007-272758

(51) Int. Cl.
*G06F 3/12* (2006.01)
(52) U.S. Cl. ................ 358/1.15; 399/8; 399/11; 399/82
(58) Field of Classification Search .......... 358/1.15, 358/1.9, 1.14, 1.13, 3.28, 100; 382/100, 382/11, 8, 82; 709/220, 224; 715/274, 255; 370/312

See application file for complete search history.

(56) References Cited

U.S. PATENT DOCUMENTS

| | | | | |
|---|---|---|---|---|
| 6,003,078 A | * | 12/1999 | Kodimer et al. | 709/224 |
| 6,903,834 B1 | * | 6/2005 | Mori | 358/1.15 |
| 7,068,386 B2 | * | 6/2006 | Kawanabe | 358/1.15 |
| 7,567,360 B2 | * | 7/2009 | Takahashi et al. | 358/1.15 |
| 7,643,769 B2 | * | 1/2010 | Akazawa | 399/82 |
| 7,755,784 B2 | * | 7/2010 | Parry et al. | 358/1.15 |
| 7,773,888 B2 | * | 8/2010 | Katsumi | 399/8 |
| 7,924,442 B2 | * | 4/2011 | Watabe | 358/1.1 |
| 2002/0001100 A1 | * | 1/2002 | Kawanabe | 358/1.15 |
| 2004/0190057 A1 | * | 9/2004 | Takahashi et al. | 358/1.15 |
| 2006/0082821 A1 | * | 4/2006 | Yamaya | 358/1.15 |
| 2006/0114499 A1 | * | 6/2006 | Sumita et al. | 358/1.15 |
| 2007/0086047 A1 | * | 4/2007 | Oh | 358/1.15 |
| 2007/0141988 A1 | * | 6/2007 | Kuehnel et al. | 455/41.2 |
| 2008/0147522 A1 | * | 6/2008 | Foth | 705/30 |
| 2008/0259396 A1 | * | 10/2008 | Saeki | 358/1.15 |
| 2009/0201529 A1 | * | 8/2009 | Takahara | 358/1.15 |

FOREIGN PATENT DOCUMENTS

| | | |
|---|---|---|
| JP | 2002-288368 | 10/2002 |
| JP | 2002288368 A * | 10/2002 |
| JP | 2006-92008 | 4/2006 |

* cited by examiner

*Primary Examiner* — Marivelisse Santiago Cordero
*Assistant Examiner* — Moustapha Diaby
(74) *Attorney, Agent, or Firm* — Canon USA, Inc., IP Division

(57) ABSTRACT

A first image processing apparatus detects pressing of a call button, and issues call-button pressing identifying information serving as request identifying information. The first image processing apparatus searches for another image processing apparatus, and when detecting a second image processing apparatus, the first image processing apparatus transmits the issued call-button pressing identifying information to the detected second image processing apparatus. Furthermore, the first image processing apparatus transmits the call-button pressing identifying information serving as the request identifying information and image processing apparatus identifying information of the first image processing apparatus to a management apparatus. When detecting pressing of a call button of the second image processing apparatus, the second image processing apparatus transmits the call-button pressing identifying information received from the first image processing apparatus and image processing apparatus identifying information of the second image processing apparatus to the management apparatus.

16 Claims, 21 Drawing Sheets

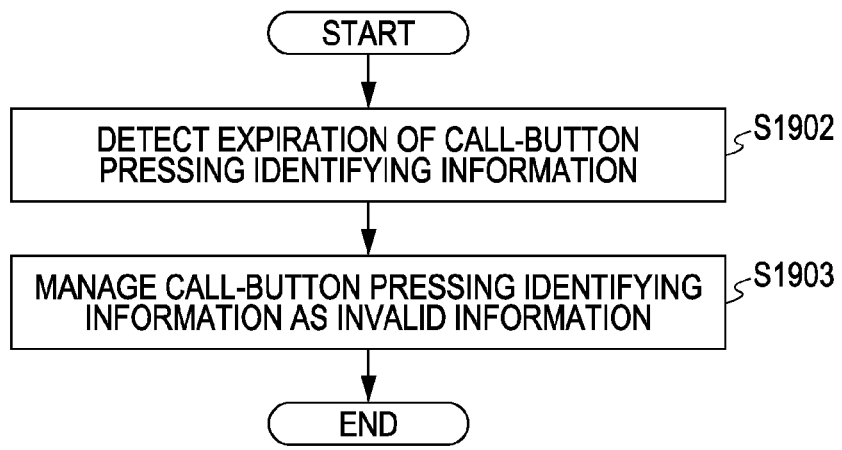
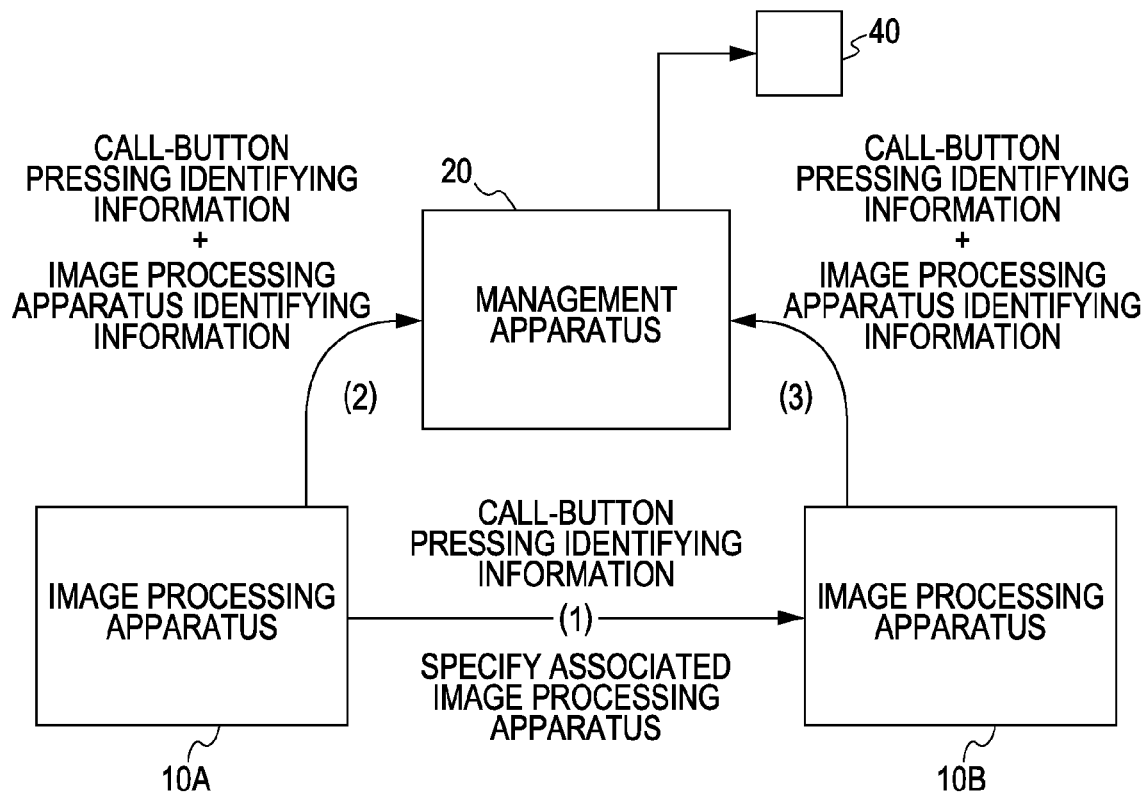

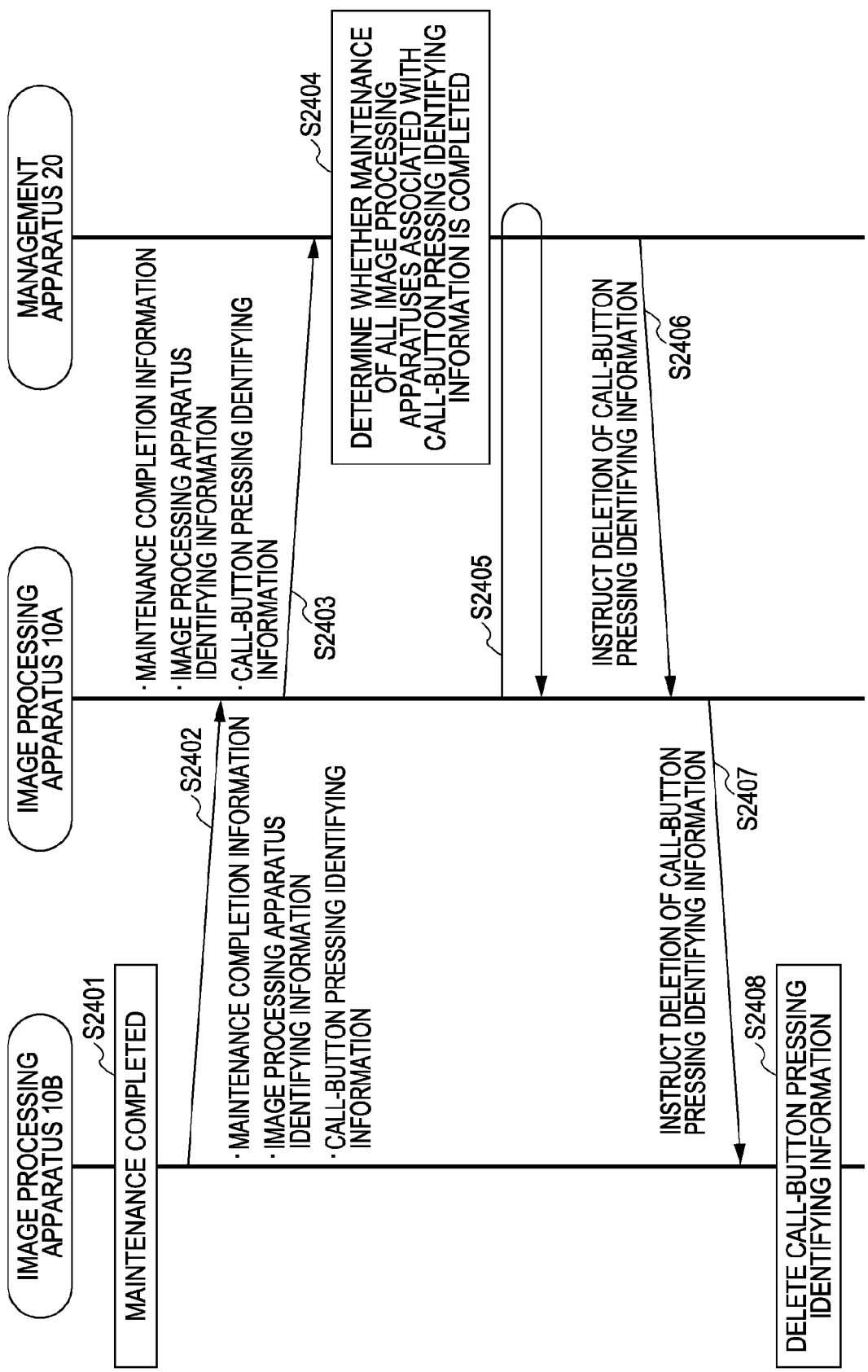

FIG. 24

STORAGE MEDIUM SUCH AS FD OR CD-ROM

| DIRECTORY INFORMATION |
|---|
| FIRST PROCESSING PROGRAM<br>PROGRAM CODE GROUP CORRESPONDING TO STEPS OF FLOWCHART IN FIG. 6 |
| SECOND PROCESSING PROGRAM<br>PROGRAM CODE GROUP CORRESPONDING TO STEPS OF FLOWCHART IN FIG. 7 |
| THIRD PROCESSING PROGRAM<br>PROGRAM CODE GROUP CORRESPONDING TO STEPS OF FLOWCHART IN FIG. 8 |
| FOURTH PROCESSING PROGRAM<br>PROGRAM CODE GROUP CORRESPONDING TO STEPS OF FLOWCHART IN FIG. 9 |
| FIFTH PROCESSING PROGRAM<br>PROGRAM CODE GROUP CORRESPONDING TO STEPS OF FLOWCHART IN FIG. 10 |
| SIXTH PROCESSING PROGRAM<br>PROGRAM CODE GROUP CORRESPONDING TO STEPS OF FLOWCHART IN FIG. 11 |
| SEVENTH PROCESSING PROGRAM<br>PROGRAM CODE GROUP CORRESPONDING TO STEPS OF FLOWCHART IN FIG. 12 |
| EIGHTH PROCESSING PROGRAM<br>PROGRAM CODE GROUP CORRESPONDING TO STEPS OF FLOWCHART IN FIG. 14 |
| NINTH PROCESSING PROGRAM<br>PROGRAM CODE GROUP CORRESPONDING TO STEPS OF FLOWCHART IN FIG. 18 |
| 10TH PROCESSING PROGRAM<br>PROGRAM CODE GROUP CORRESPONDING TO STEPS OF FLOWCHART IN FIG. 20 |
| 11TH PROCESSING PROGRAM<br>PROGRAM CODE GROUP CORRESPONDING TO STEPS OF FLOWCHART IN FIG. 21 |
| 12TH PROCESSING PROGRAM<br>PROGRAM CODE GROUP CORRESPONDING TO STEPS OF FLOWCHART IN FIG. 22 |
| |

FIG. 25

| STORAGE MEDIUM SUCH AS FD OR CD-ROM |
|---|
| DIRECTORY INFORMATION |
| FIRST PROCESSING PROGRAM<br>PROGRAM CODE GROUP CORRESPONDING TO STEPS OF FLOWCHART IN FIG. 15 |
| SECOND PROCESSING PROGRAM<br>PROGRAM CODE GROUP CORRESPONDING TO STEPS OF FLOWCHART IN FIG. 16 |
| |

MONITORING SYSTEM, IMAGE PROCESSING APPARATUS, AND METHOD FOR REQUEST PROCESSING

BACKGROUND OF THE INVENTION

1. Field of the Invention

The present invention relates to processing of managing maintenance requests of a plurality of image processing apparatuses and arranging for dispatch of a service person.

2. Description of the Related Art

In general, a remote monitoring system in which a management apparatus remotely monitors a state of an image processing apparatus including a printing function and automatically detects an unusual state of the image processing apparatus is known.

In this system, the management apparatus performs processing of arranging for dispatch of a service person so that the service person can immediately carry out repair on the image processing apparatus. Furthermore, a known technique includes a technique in which the management apparatus arranges for dispatch of a service person taking the location and schedule information of the service person into consideration in a case where the management apparatus detects unusual states of the plurality of image processing apparatuses (refer to Japanese Patent Laid-Open No. 2002-288368).

Here, a problem which is not detected by the management apparatus by monitoring the image processing apparatus and which is inconvenient for a user may arise.

Examples of the problem include deterioration of an image and damage to an exterior. To address an occurrence of such a problem, a technique of arranging a call button on the image processing apparatus in order to notify the management apparatus of a maintenance request has been proposed (refer to Japanese Patent Laid-Open No. 2006-92008).

In the monitoring system described above, in a case where a plurality of image processing apparatuses which are installed in the same location or which are connected to the same local area network are simultaneously detected as unusual states, when a single service person is dispatched for repairing the plurality of image processing apparatuses, reduced operating cost is attained.

Furthermore, as the number of image processing apparatuses to be monitored increases, it is highly possible that the burden on the management apparatus performing processing of sending or arranging for dispatch of a service person becomes high. It is preferable that this processing become simplified.

The technique described above in which the management apparatus arranges for dispatch of a service person taking the location and schedule information into consideration when a plurality of image processing apparatuses have been detected to be in unusual states has the following problem.

When information which associates image processing apparatuses located in the same location with one another is not obtained, different service persons may be sent in order to cope with the unusual states of the image processing apparatuses located in the same location which are simultaneously detected.

Furthermore, when arranging for dispatch of a service person, the management apparatus is required to refer to the latest location information and the latest schedule information of the service person. This imposes a heavy management burden on the management apparatus.

On the other hand, the technique in which call buttons are arranged on image processing apparatuses in order to notify the management apparatus of maintenance requests has the following problem.

When maintenance requests are simultaneously issued from a plurality of image processing apparatuses located in the same location by pressing call buttons, since information on association of the plurality of image processing apparatuses is not obtained, different service persons may be sent to individual image processing apparatuses.

When a plurality of service persons simultaneously visit the location where the image processing apparatuses are installed, there arises a problem in that the burden on an administrator at the location increases.

Therefore, when simultaneously arranging for dispatch of a service person to a plurality of image processing apparatuses in the same location, the management apparatus is required not to send different service persons to the location. Furthermore, the processing of arranging for dispatch of a service person is preferably not complicated.

SUMMARY OF THE INVENTION

The present invention provides a system of arranging for dispatch of a service person who is to repair a first image processing apparatus and a second image processing apparatus so that a plurality of image processing apparatuses are efficiently repaired.

A monitoring system according to an exemplary embodiment of the present invention has the following configuration.

According to an exemplary embodiment of the present invention, there is provided a monitoring system including a plurality of image processing apparatuses and a management apparatus which manages the plurality of image processing apparatuses, each of the plurality of image processing apparatuses having an instruction unit configured to transmit a maintenance request to the management apparatus in response to a user's instruction, including a first image processing apparatus which is one of the plurality of image processing apparatuses, including a request identifying information issuing unit configured to issue request identifying information in response to the user's instruction when the user's instruction input through the instruction unit is detected, a first transmission unit configured to transmit the request identifying information issued by the request identifying information issuing unit and apparatus identifying information of the first image processing apparatus to the management apparatus, and a notification unit configured to notify a second image processing apparatus which is connected to the first image processing apparatus through a network of the request identifying information. Furthermore, the monitoring system includes, the second image processing apparatus including a first reception unit configured to receive the request identifying information notified from the notification unit, and a second transmission unit configured to transmit the request identifying information received by the first reception unit and apparatus identifying information of the second image processing apparatus to the management apparatus without issuing request identifying information when the user's instruction input through an instruction unit included in the second image processing apparatus is detected.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 16 is a flowchart illustrating an example of a second data processing step of the management apparatus according to the first exemplary embodiment of the present invention.

FIG. 17 is a block diagram illustrating an example of a monitoring system according to a second exemplary embodiment of the present invention.

FIG. 23 is a diagram showing a workflow illustrating a data processing state of a monitoring system according to the third exemplary embodiment of the present invention.

FIG. 24 is a diagram illustrating a memory map of a storage medium which stores various data processing programs which are readable using the image processing apparatus according to a forth exemplary embodiment of the present invention.

FIG. 25 is a diagram illustrating a memory map of a storage medium which stores various data processing programs which are readable using the management apparatus according to the fourth exemplary embodiment of the present invention.

DESCRIPTION OF THE EXEMPLARY EMBODIMENTS

Figure 1:
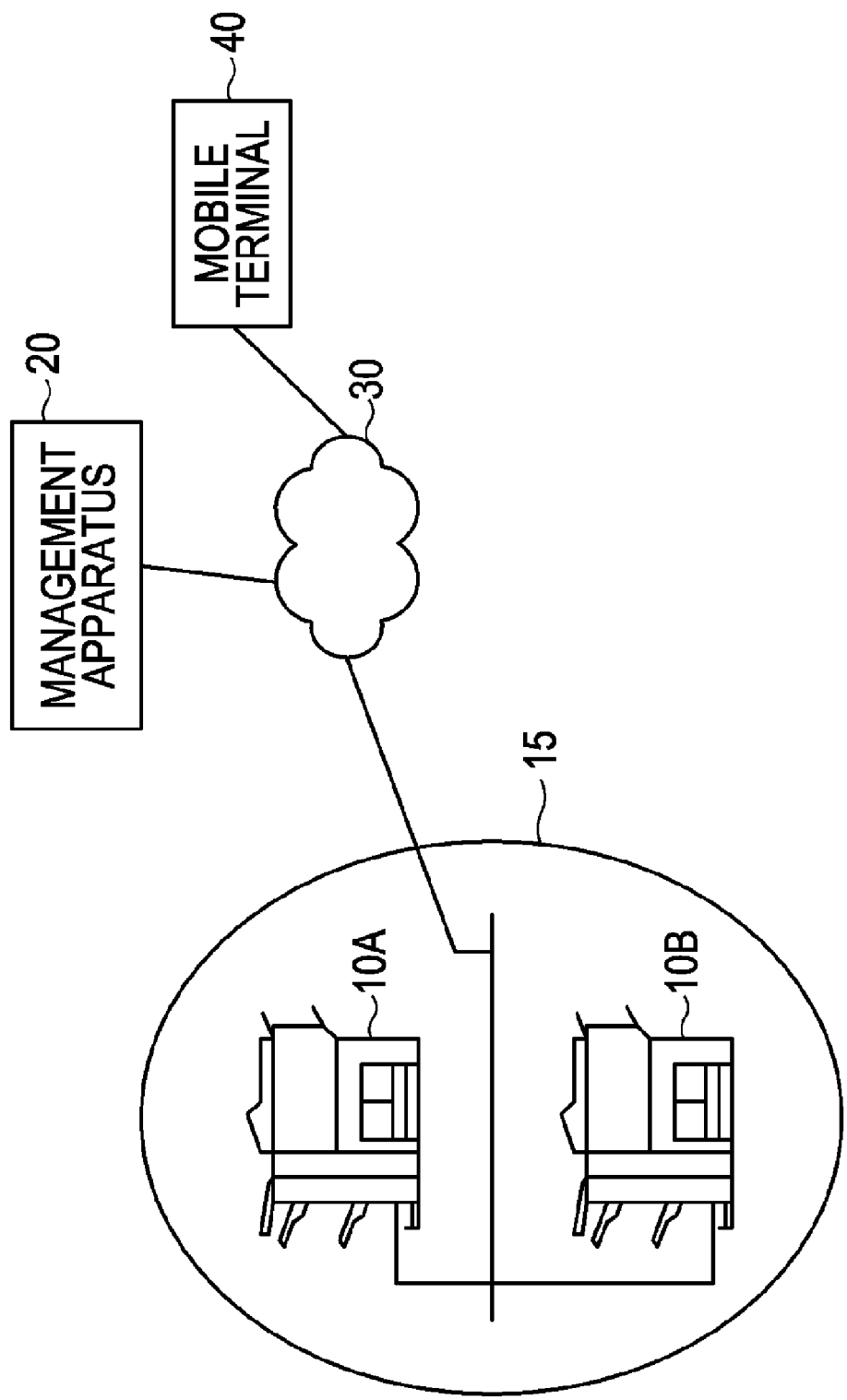
FIG. 1 is a diagram illustrating an example of a monitoring system according to a first exemplary embodiment of the present invention.

Exemplary embodiments of the present invention will be described with reference to the accompanying drawings.
Explanation of System Configuration
First Exemplary Embodiment FIG. 1 is a diagram illustrating an example of a monitoring system according to a first exemplary embodiment. In this example of the system, image processing apparatuses 10A and 10B (hereinafter referred to as an image processing apparatus 10 unless otherwise distinguished) are connected to a management apparatus 20 through a network 30 for communication. Note that the number of image processing apparatuses is not limited to this, and the present invention is applicable to a system including a plurality of image processing apparatuses in addition to the image processing apparatuses 10A and 10B which are connected to the management apparatus 20.

In FIG. 1, a service person who repairs the image processing apparatus 10 has a mobile terminal 40 capable of connecting to the network 30.

Examples of the image processing apparatus 10 include a multifunction printer, an MFP (Multifunction Peripheral), and a copier. In this exemplary embodiment, one of the image processing apparatuses 10A and 10B serves as a first image processing apparatus and the other serves as a second image processing apparatus.

Figure 2:
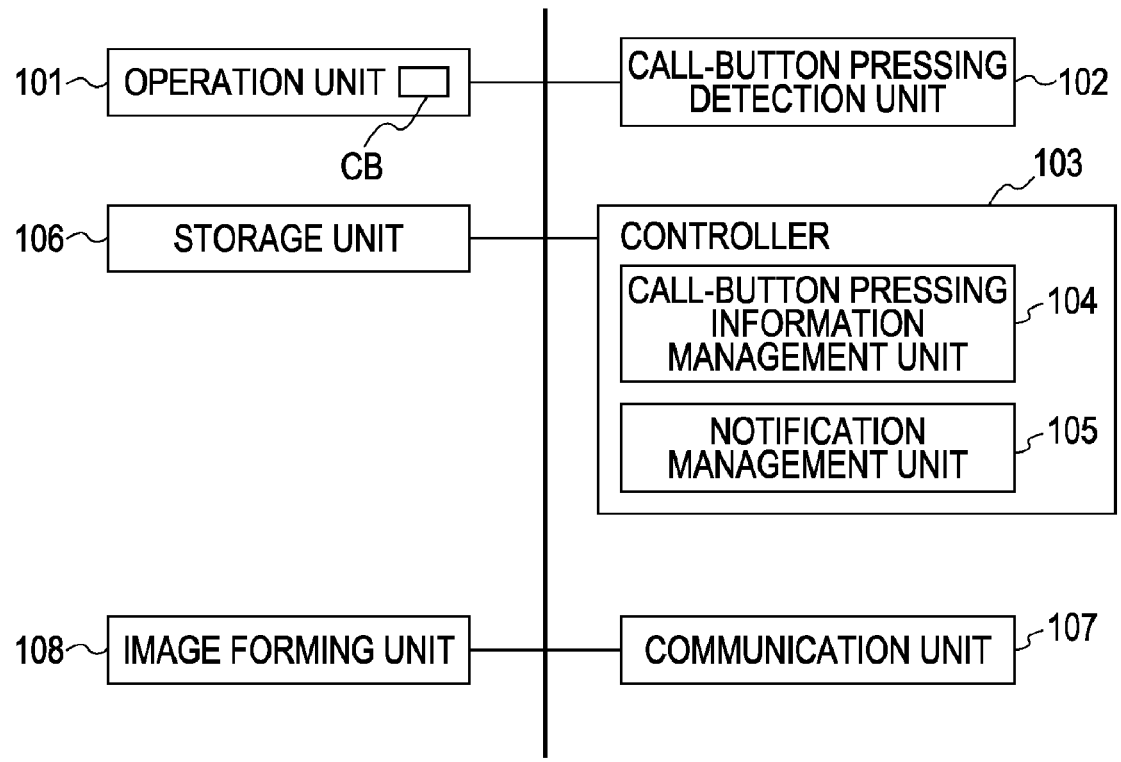
FIG. 2 is a diagram illustrating an example of a configuration of an image processing apparatus shown in FIG. 1.

The image processing apparatus 10 includes a call button used to request a service person to carry out repairs in an operation unit. The image processing apparatus 10 transmits information on pressing of a call button CB to the management apparatus 20 or another image processing apparatus. Here, the call button CB functions as an instruction unit used to request a service person to carry out repairs. Alternatively, the call button CB may be disposed on an apparatus body as a switch separately from the operation unit. An instruction input in accordance with an operation of the call button CB is detected using a call-button pressing detection unit 102 as shown in FIG. 2.

The image processing apparatus 10 has a function of transmitting an unusual state which is generated in the image processing apparatus 10 to the management apparatus 20.

A monitoring terminal (not shown) which is installed in a maintenance area 15 and which is connected to the local area network for communication may notifies the management apparatus 20 of the unusual state of the image processing apparatus 10.

The management apparatus 20 manages the unusual state of the image processing apparatus 10. When determined that the image processing apparatus 10 requires to be repaired, the management apparatus 20 selects a service person from among a plurality of service persons and notifies the mobile terminal 40 of the selected service person of necessity of repair of the image processing apparatus 10 by e-mail, for example.

Furthermore, the management apparatus 20 manages information on pressing of call buttons CB of the image processing apparatus 10, selects a service person from among a plurality of service persons, and notifies the mobile terminal 40 of the selected service person of the information. Note that, in FIG. 1, the network 30 corresponds to a communication line such as the Internet.

The maintenance area 15 corresponds to an area where the service person performs maintenance and corresponds to an area of an environment in a single organization or a single department in which a plurality of image processing apparatuses are closely installed.

FIG. 2 is a diagram illustrating an example of a configuration of the image processing apparatus 10 (image processing apparatuses 10A and 10B) shown in FIG. 1.

Referring to FIG. 2, the image processing apparatus 10 includes an operation unit 101, the call-button pressing detection unit 102, a controller 103, a storage unit 106, a communication unit 107, and an image forming unit 108. The controller 103 includes a call-button pressing information management unit 104 and a notification management unit 105.

The operation unit 101 includes a key (button) used to issue an operation instruction, such as a printing instruction, to the image processing apparatus 10 and a display unit so that a UI (User Interface) screen is displayed in accordance with a printing mode.

Although the operation unit 101 includes the call button CB, the call button CB may be independently disposed in a certain portion separately from the operation unit 101.

The call-button pressing detection unit 102 detects whether the call button CB included in the operation unit 101 is pressed, and supplies detected information on pressing of the call button CB to the call-button pressing information management unit 104.

The controller 103 included in the image processing apparatus 10 performs printing control, manages an unusual state, and manages the information on pressing of the call button CB and notification information.

The call-button pressing information management unit 104 included in the image processing apparatus 10 performs the following processing when the call button CB of the image processing apparatus 10 is pressed.

The call-button pressing information management unit 104 issues call-button pressing identifying information serving as request identifying information, stores the call-button pressing identifying information, activates notification management unit 105, and deletes the call-button pressing identifying information. Here, the call-button pressing identifying information includes a time stamp and a device ID generated in response to pressing of the call button CB of the image processing apparatus 10.

Note that the call button CB is normally pressed when a maintenance request is issued for requesting a service person to cope with a failure occurred in the image processing apparatus 10.

When the call button CB is pressed in one of the image processing apparatuses 10A and 10B, the call-button pressing identifying information is supplied to the other of the image processing apparatuses 10A and 10B installed near the one of the image processing apparatuses 10A and 10B which includes the failure in the maintenance area 15 in accordance with control described below. Here, the maintenance area 15 corresponds to an area set when a maintenance contract is made by a client who owns the image processing apparatuses 10A and 10B. Note that the number of the image processing apparatuses included in the maintenance area 15 is not limited in this exemplary embodiment. In a case where destinations of notification of information on pressing of a call button CB of one of a plurality of image processing apparatuses installed in the maintenance area 15 are registered in advance, the call-button pressing identifying information is supplied to image processing apparatuses corresponding to the destinations of notification (notification by multicast).

On the other hand, in a case where destinations of notification of information on pressing of a call button CB of one of a plurality of image processing apparatuses installed in the maintenance area 15 are not registered in advance, the call-button pressing identifying information is supplied to all the image processing apparatuses which are connected to one another through the same LAN (Local Area Network) and which are managed using a rooter (notification by broadcast).

Furthermore, the call-button pressing information management unit 104 assigns an expiration time to the call-button pressing identifying information, and performs a control operation when receiving the call-button pressing identifying information from another image processing apparatus.

The notification management unit 105 generates notification information, specifies a destination of the notification information, and generates notification data in accordance with a state of the image processing apparatus 10. Examples of the state of the image processing apparatus 10 include a state in which the image processing apparatus 10 detects pressing of the call button CB and a state in which the image processing apparatus 10 receives the call-button pressing identifying information from another image processing apparatus.

The storage unit 106 stores therein the call-button pressing identifying information, image processing apparatus information, management apparatus information, and information on another image processing apparatus. Furthermore, the storage unit 106 stores therein expiration time information of the call-button pressing identifying information and display data of the call button CB.

Moreover, the storage unit 106 of the image processing apparatus 10 stores therein data representing operation history of the image processing apparatus 10 or data representing various unusual states.

Here, the image processing apparatus information includes image processing apparatus identifying information such as an apparatus ID and communication information such as an IP address. The management apparatus information includes communication information such as an IP address of the management apparatus 20 which manages the image processing apparatus 10.

The communication unit 107 transmits the notification data relating to pressing of the call button CB of the image processing apparatus 10 to and receives it from another image processing apparatus. The notification data is transmitted and received by e-mail or using an HTTP protocol.

The image forming unit 108 has a function of generating and outputting printing data. The image processing apparatus 10 may include a facsimile function and a copying function (not shown).

Figure 3:
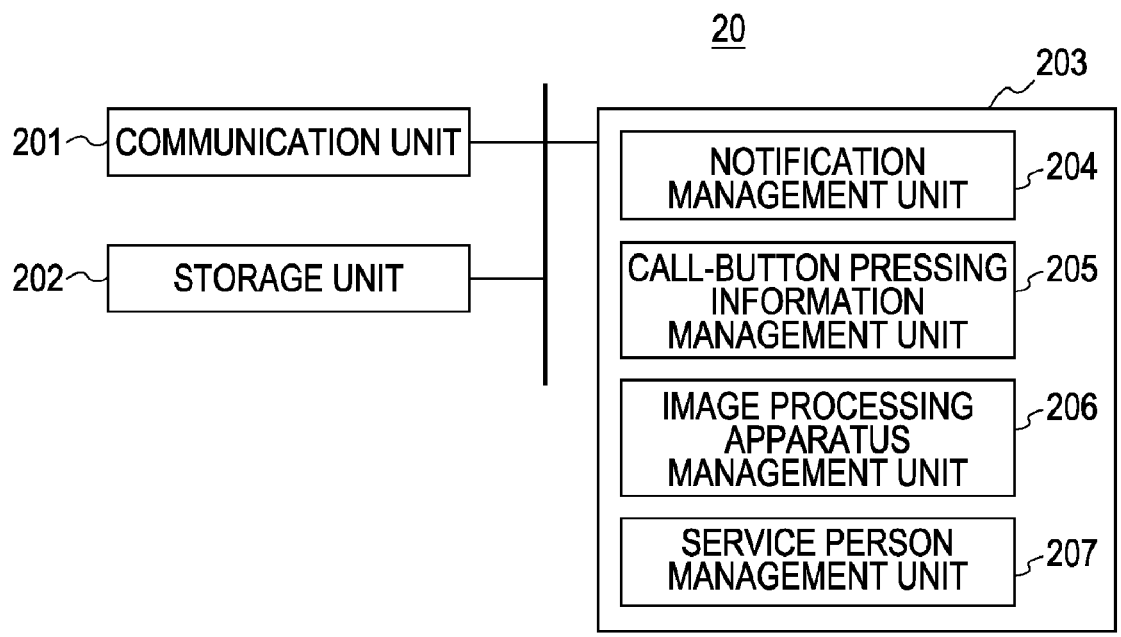
FIG. 3 is a block diagram illustrating an example of a configuration of a management apparatus shown in FIG. 1.

FIG. 3 is a block diagram illustrating an example of a configuration of the management apparatus 20 shown in FIG. 1.

Referring to FIG. 3, the management apparatus 20 includes a communication unit 201, a storage unit 202, and a controller 203. The communication unit 201 has a function of communicating with the image processing apparatuses 10A and 10B and the mobile terminal 40 shown in FIG. 1.

The communication unit 201 receives notification data relating to pressing of the call button CB from the image processing apparatus 10, and notifies the mobile terminal 40 of necessity of repair of the image processing apparatus 10 by transmitting the notification data.

Furthermore, the storage unit 202 stores therein the image processing apparatus information, the information on pressing of the call button CB, service person information, and the notification data.

The controller 203 includes a notification management unit 204, a call-button pressing information management unit 205, an image processing apparatus management unit 206, and a service person management unit 207.

The controller 203 has a control function of managing information required for monitoring and performing maintenance of the image processing apparatus 10.

The notification management unit 204 generates notification information, specifies a destination of notification, and generates notification data. Notification corresponding to the notification data includes notification of a maintenance request to a service person and notification of a request of supplies.

The call-button pressing information management unit 205 manages association between the image processing apparatus identifying information of the image processing apparatus 10 in which the call button CB thereof is pressed and the call-button pressing identifying information. Note that pieces of image processing apparatus identifying information corresponding to the plurality of image processing apparatuses 10A and 10B may be associated with a single piece of call-button pressing identifying information.

When expiration time has been assigned to the call-button pressing identifying information, the call-button pressing information management unit 205 manages the expiration time.

Furthermore, the call-button pressing information management unit 205 invalidates the association between the call-button pressing identifying information and the image processing apparatus identifying information when the expiration time of the call-button pressing identifying information is reached.

The image processing apparatus management unit 206 manages the image processing apparatus 10 on which maintenance is to be performed. The image processing apparatus management unit 206 manages the image processing apparatus identifying information, information on an unusual state of the image processing apparatus 10, maintenance history, information on an administrator of the image processing apparatus 10, and information on management of supplies of the image processing apparatus 10.

The service person management unit 207 manages information on a service person who performs maintenance on the image processing apparatus 10. The service person management unit 207 manages a contact address of the service person, associates the call-button pressing identifying information and the service person, and arranges for dispatch of the service person who repairs the image processing apparatus 10.

When receiving notification of a maintenance request including the call-button pressing identifying information which has been received before from a different image processing apparatus, the service person management unit 207 assigns the maintenance of the image processing apparatus to the service person who is associated with the call-button pressing identifying information which has been received before.

Operation of Remote Monitoring System

Figure 4:
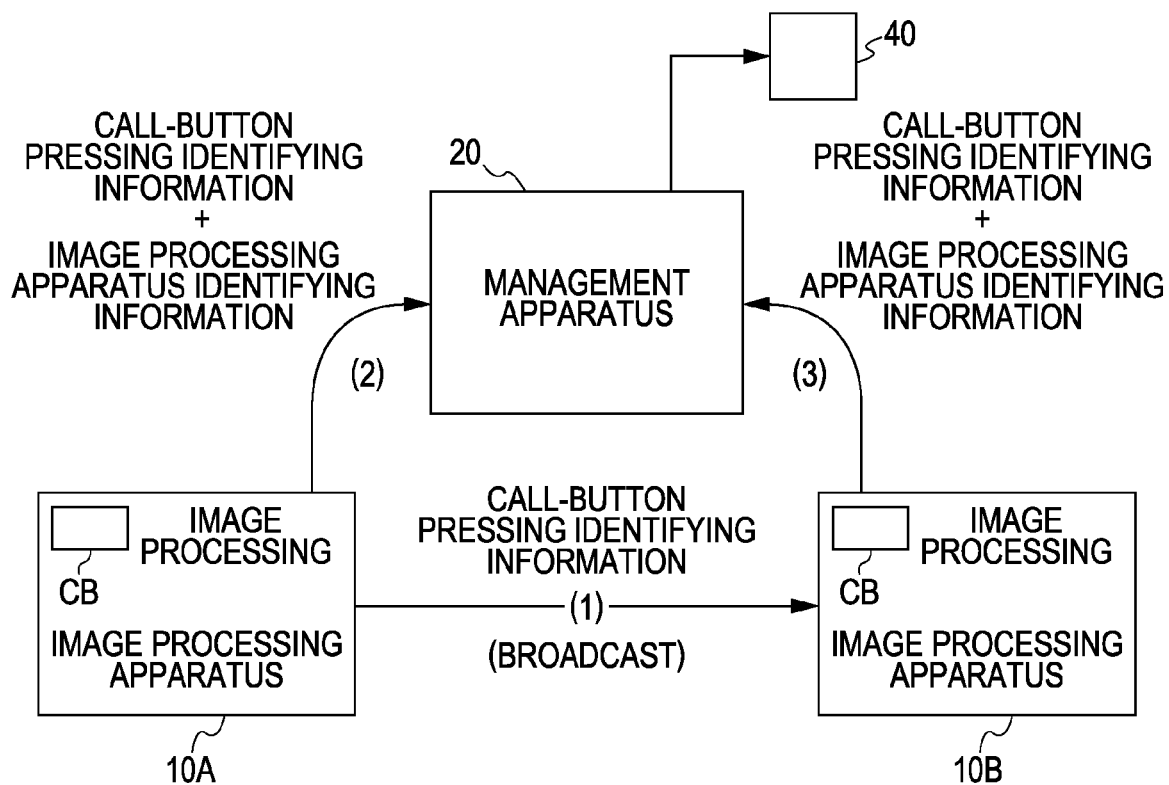
FIG. 4 is a block diagram illustrating an example of a monitoring system according to the first exemplary embodiment of the present invention.

FIG. 4 is a block diagram illustrating an example of the monitoring system according to the first exemplary embodiment of the present invention.

Referring to FIG. 4, the monitoring system includes a plurality of image processing apparatuses, each of which does not have image processing information, such as an IP address, of the other image processing apparatuses.

In the example of FIG. 4, the monitoring system includes two image processing apparatuses, that is, the image processing apparatus 10A, the call button thereof being pressed first, and the image processing apparatus 10B which receives call-button pressing identifying information from the image processing apparatus 10A. The monitoring system further includes the management apparatus 20.

The management apparatus 20 makes an arrangement for dispatching a service person having the mobile terminal 40 to be operated in accordance with a maintenance request transmitted from the image processing apparatus 10B which received the maintenance request from the image processing apparatus 10A on the basis of a control described below. Here, the "arrangement" includes an arrangement made by e-mail and an arrangement made by a phone, for example. The arrangement for dispatching a service person may be made using a service system in which the management apparatus 20 transmits a request for dispatching a service person to a dispatch center (not shown) and the dispatch center makes the arrangement for dispatching a service person. That is, even when the dispatch center makes the arrangement for dispatching a service person, the control of the management apparatus 20, which will be described hereinafter, is realized by a cooperative operation between the dispatch center and the management apparatus 20.

First, the call button CB of the image processing apparatus 10A is pressed. When detecting the pressing of the call button CB, the image processing apparatus 10A issues call-button pressing identifying information serving as request identifying information. Then, the image processing apparatus 10A searches the maintenance area 15 for another image processing apparatuses by broadcast. When detecting the image processing apparatus 10B, the image processing apparatus 10A transmits the issued call-button pressing identifying information to the image processing apparatus 10A (1).

Then, the image processing apparatus 10A transmits the call-button pressing identifying information functioning as the request identifying information and image processing apparatus identifying information of the image processing apparatus 10A to the management apparatus 20 (2). This is first transmission processing performed using the image processing apparatus 10A functioning as the first image processing apparatus.

When receiving the call-button pressing identifying information from the image processing apparatus 10A, the image processing apparatus 10B functioning as the second image processing apparatus to store the call-button pressing identifying information in the storage unit 106. Then, when detecting pressing of the call button CB of the image processing apparatus 10B, the image processing apparatus 10B transmits the call-button pressing identifying information received from the image processing apparatus 10A and image processing apparatus identifying information of the image processing apparatus 10B to the management apparatus 20 (3). This is second transmission processing performed using the image processing apparatus 10B functioning as the second image processing apparatus.

The management apparatus 20 manages the call-button pressing identifying information and the image processing apparatus identifying information by associating them with each other. Furthermore, the management apparatus 20 associates the call-button pressing identifying information with a service person and makes an arrangement for dispatching the service person to the location where the image processing apparatus 10, the call button CB thereof having been pressed, is installed.

Since the image processing apparatus 10A and the image processing apparatus 10B are associated with each other by the identical call-button pressing identifying information, the same service person is assigned to the image processing apparatuses 10A and 10B.

In a case where the image processing apparatus 10A requires restocking of supplies and in a case where paper jams are likely to frequently occur in the image processing apparatus 10A, the service person and the user may deal with those problems at the time of maintenance.

In order to assist the service person in determining what kinds of maintenance should be made at the same time, detections of information on the latest state of the image processing apparatus 10A and information on the latest state of image processing apparatus 10B may be added to the processing of (2) and the processing of (3).

Figure 5:
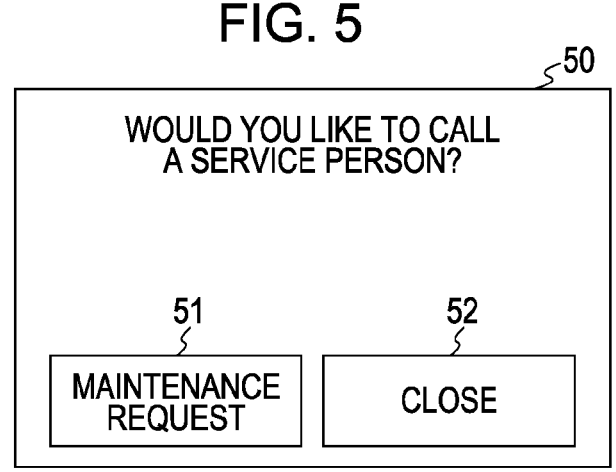
FIG. 5 is a diagram illustrating an example of a call button displayed in an operation unit of the image processing apparatus shown in FIG. 1.

FIG. 5 is a diagram illustrating an example of the call button CB displayed in the operation unit 101 of the image processing apparatus 10A of FIG. 1.

Note that a plurality of screens are switched from one to another using the operation unit 101. A service person maintenance request screen 50 which is one of the plurality of screens is displayed using the operation unit 101.

When the user desires to request a service person to perform maintenance, the user presses a maintenance request button 51 of the service person maintenance request screen 50. On the other hand, when the user does not wish to request a service person to perform maintenance, the user may press a close button 52.

Figure 6:
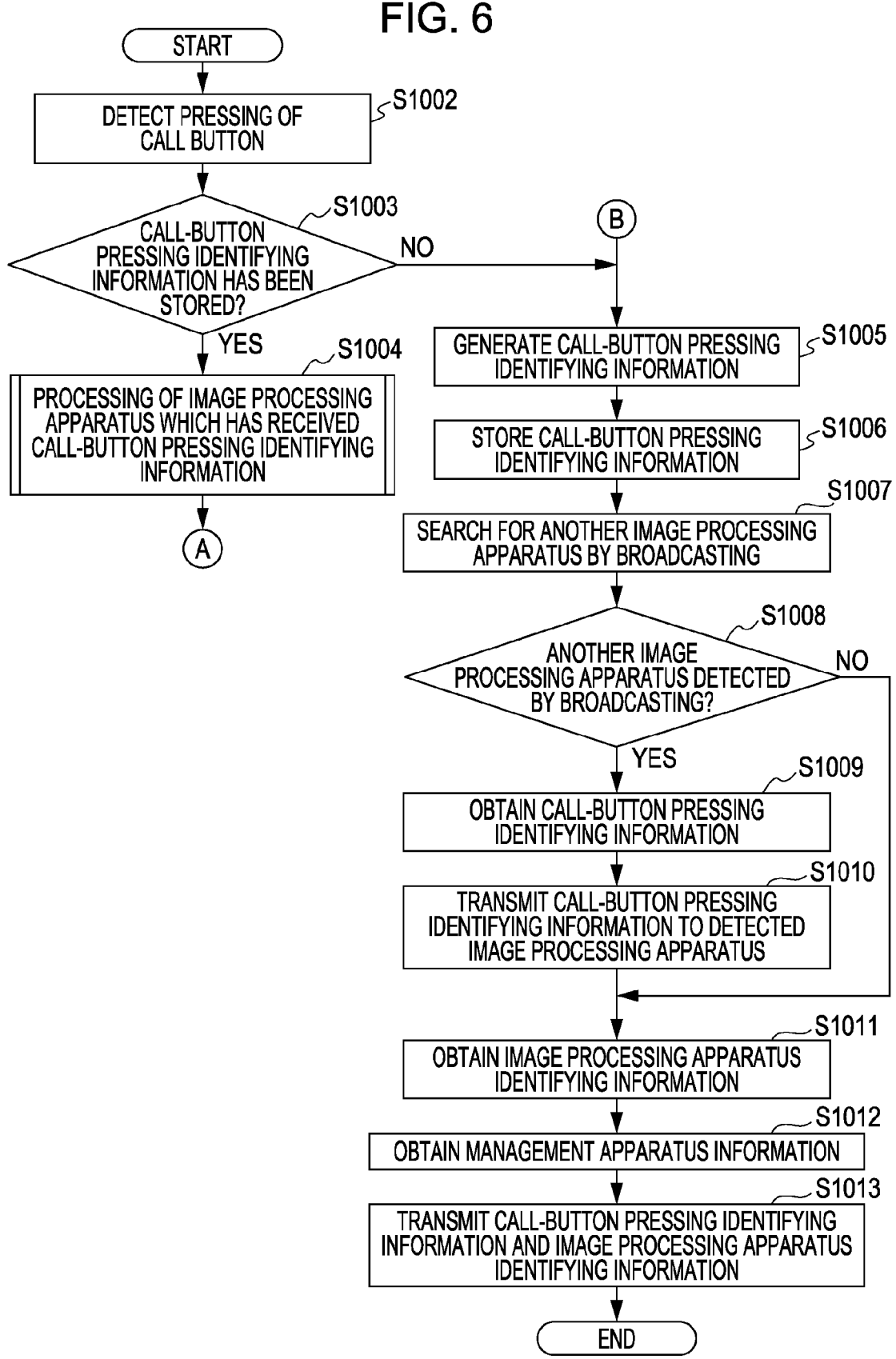
FIG. 6 is a flowchart illustrating an example of a first data processing step of the image processing apparatus according to the first exemplary embodiment of the present invention.

FIG. 6 is a flowchart illustrating an example of first data processing of the image processing apparatus according to this exemplary embodiment. This example shows processing performed when pressing of the call button CB is detected using the image processing apparatus 10A shown in FIG. 4. The image processing apparatus 10A does not have call-button pressing identifying information at a time when the call button CB is pressed, but generates call-button pressing identifying information by itself.

Note that steps S1002 to S1013 are realized by executing a control program stored in the storage unit 106 using the controller 103 included in the image processing apparatus 10A.

When starting this processing, the image processing apparatus 10A detects pressing of the call button CB through the service person maintenance request screen 50 of FIG. 5 displayed in the operation unit 101 in step S1002.

In step S1003, the controller 103 of the image processing apparatus 10A determines whether call-button pressing identifying information is included in the storage unit 106.

When the determination is affirmative in step S1003, the process proceeds to step S1004.

On the other hand, when the determination is negative in step S1003, the process proceeds to step S1005.

Figure 7:
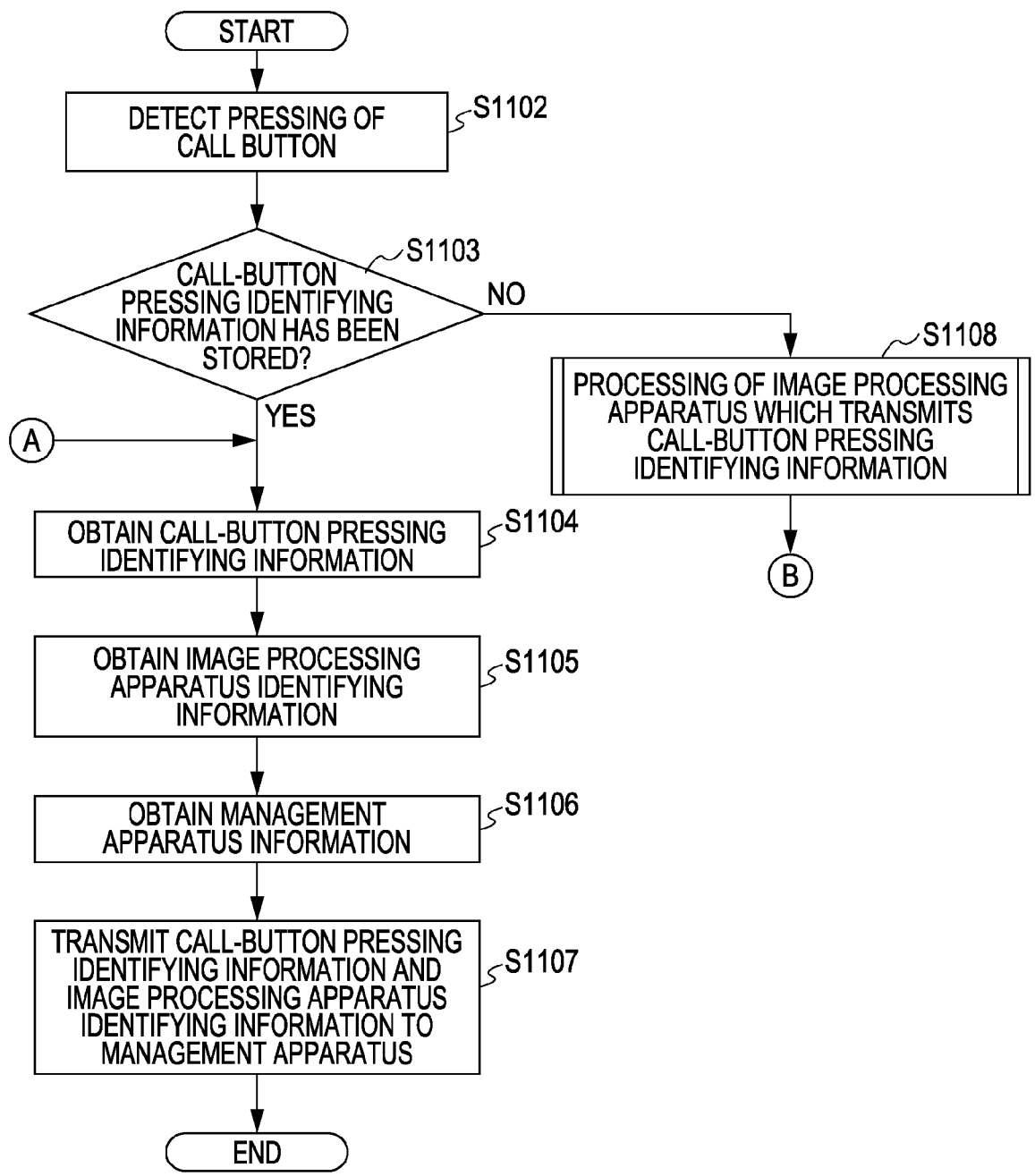
FIG. 7 is a flowchart illustrating an example of a second data processing step of the image processing apparatus according to the first exemplary embodiment of the present invention.

Processing in step S1004 corresponds to processing of an image processing apparatus which has the call-button pressing identifying information, that is, processing of the image processing apparatus 10B which received call-button pressing identifying information from the image processing apparatus 10A. After the processing in step S1004, the process proceeds to step S1104 in FIG. 7 represented by a destination A.

In step S1005, the image processing apparatus 10A generates call-button pressing identifying information. In step S1006, the image processing apparatus 10A stores the generated call-button pressing identifying information in the storage unit 106.

In step S1007, the image processing apparatus 10A searches the maintenance area 15 for another image processing apparatus (the image processing apparatus 10B) by broadcast.

In step S1008, the image processing apparatus 10A determines whether the image processing apparatus 10B was detected with reference to a state of a response.

When the determination is affirmative in step S1008, the process proceeds to step S1009. On the other hand, when the determination is negative in step S1008, the process proceeds to step S1011.

In step S1009, the image processing apparatus 10A obtains the call-button pressing identifying information from the storage unit 106. Then, in step S1010, the image processing apparatus 10A transmits the call-button pressing identifying information to the detected image processing apparatus 10B.

Then, the image processing apparatus 10A obtains image processing apparatus identifying information from the storage unit 106 in step S1011, and obtains management apparatus information in step S1012. Here, the management apparatus information corresponds to information on access to the management apparatus 20.

In step S1013, the image processing apparatus 10A transmits the call-button pressing identifying information and the image processing apparatus identifying information to the management apparatus 20 so as to notify the management apparatus 20 of the detection of the pressing of the call button CB of the image processing apparatus 10A.

Here, information on a state of the image processing apparatus 10A may be additionally transmitted. The process is thus terminated. Note that a destination B followed by step S1005 of FIG. 6 denotes a destination of step S1108 of FIG. 7.

FIG. 7 is a flowchart illustrating an example of second data processing of the image processing apparatus according to the first exemplary embodiment of the present invention. This example shows processing performed when pressing of the call button CB is detected using the image processing apparatus 10B shown in FIG. 4.

Note that when detecting the pressing of the call button CB, the image processing apparatus 10B has already stored therein the call-button pressing identifying information received from the image processing apparatus 10A.

Note that steps S1102 to S1108 are realized by executing a control program stored in the storage unit 106 using the controller 103 included in the image processing apparatus 10B.

When starting the processing, the image processing apparatus 10B detects pressing of the call button CB in step S1102. In step S1103, the image processing apparatus 10B determines whether the image processing apparatus 10B has call-button pressing identifying information. When the determination is affirmative in step S1103, the process proceeds to step S1104.

On the other hand, when the determination is negative in step S1103, the process proceeds to step S1108.

Processing in step S1108 corresponds to processing of an image processing apparatus which does not have call-button pressing identifying information, that is, processing of the image processing apparatus 10A which generates call-button pressing identifying information by itself. After the processing in step S1108, the process proceeds to step S1005 in FIG. 6 represented by the destination B.

In step S1104, the image processing apparatus 10B obtains the call-button pressing identifying information from the storage unit 106. Then, the image processing apparatus 10B obtains image processing apparatus identifying information from the storage unit 106 in step S1105, and obtains management apparatus information in step S1106. Here, the management apparatus information corresponds to information on access to the management apparatus 20.

Then, in step S1107, the image processing apparatus 10B transmits the call-button pressing identifying information and the image processing apparatus identifying information to the management apparatus 20 so as to notify the management apparatus 20 of the detection of the call button CB of the image processing apparatus 10B. Here, information on a state of the image processing apparatus 10B may be additionally transmitted.

The image processing apparatus 10B thus terminates the processing. Note that the destination A followed by step S1104 of FIG. 7 denotes a destination of step S1004 of FIG. 6.

Figure 8:
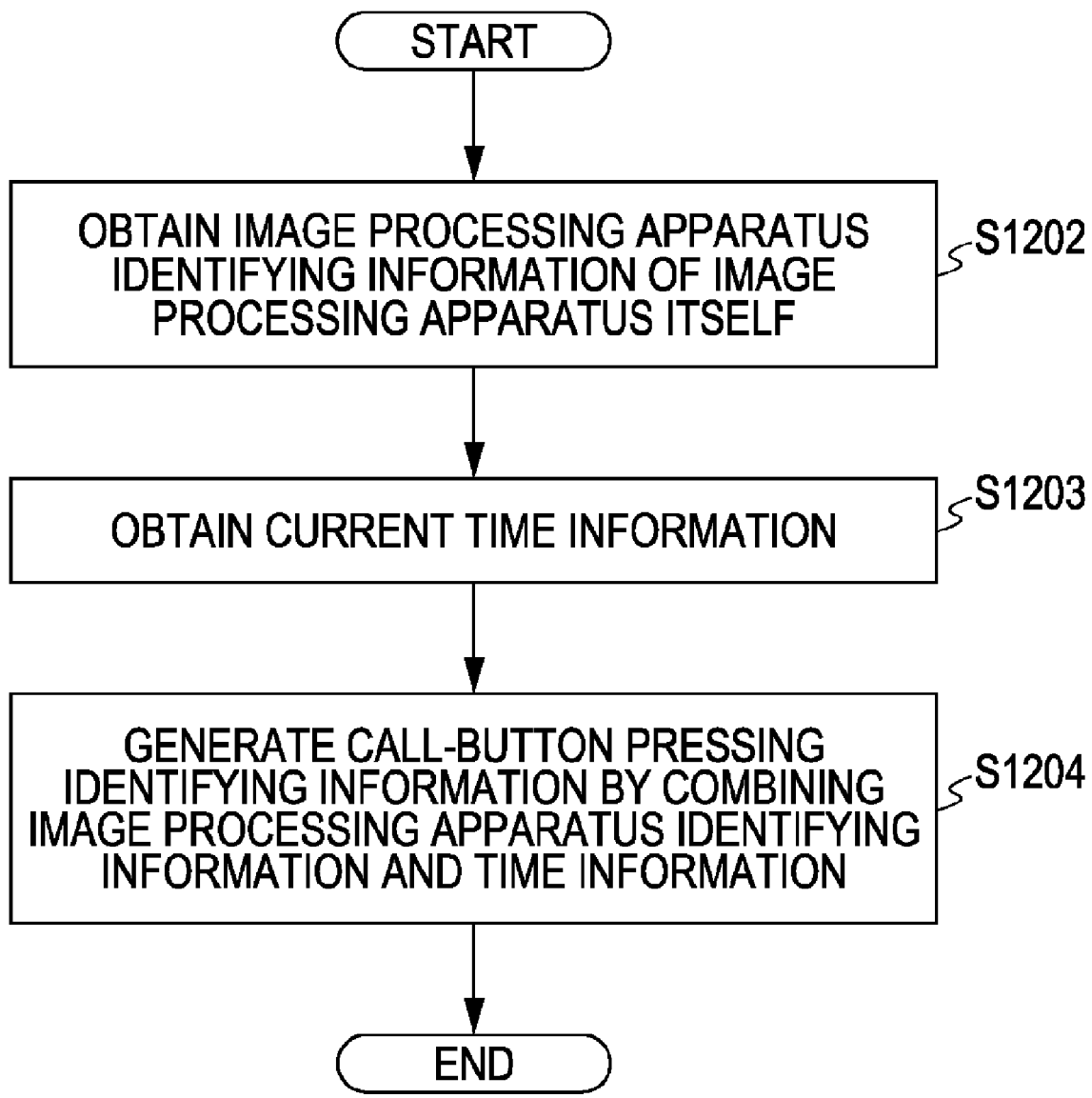
FIG. 8 is a flowchart illustrating an example of a third data processing step of the image processing apparatus according to the first exemplary embodiment of the present invention.

FIG. 8 is a flowchart illustrating an example of third data processing of the image processing apparatus according to this exemplary embodiment. This example shows an example of processing performed when the image processing apparatus 10A generates call-button pressing identifying information. Note that when the image processing apparatus 10A does not have call-button pressing identifying information at a time when pressing of the call button CB is detected, the image processing apparatus 10A generates call-button pressing identifying information by itself.

Note that steps S1202 to S1204 are realized by executing a control program stored in the storage unit 106 using the controller 103 included in the image processing apparatus 10A.

When starting the processing, the image processing apparatus 10A obtains image processing apparatus identifying information of itself from the storage unit 106 in step S1202. In step S1203, the image processing apparatus 10A obtains current time information. In step S1204, the image processing apparatus 10A generates call-button pressing identifying information by combining the image processing apparatus identifying information and the time information.

The image processing apparatus 10A thus terminates the processing.

Note that the image processing apparatus 10A may not generate the call-button pressing identifying information and may request the management apparatus 20 to generate the call-button pressing identifying information.

Figure 9:
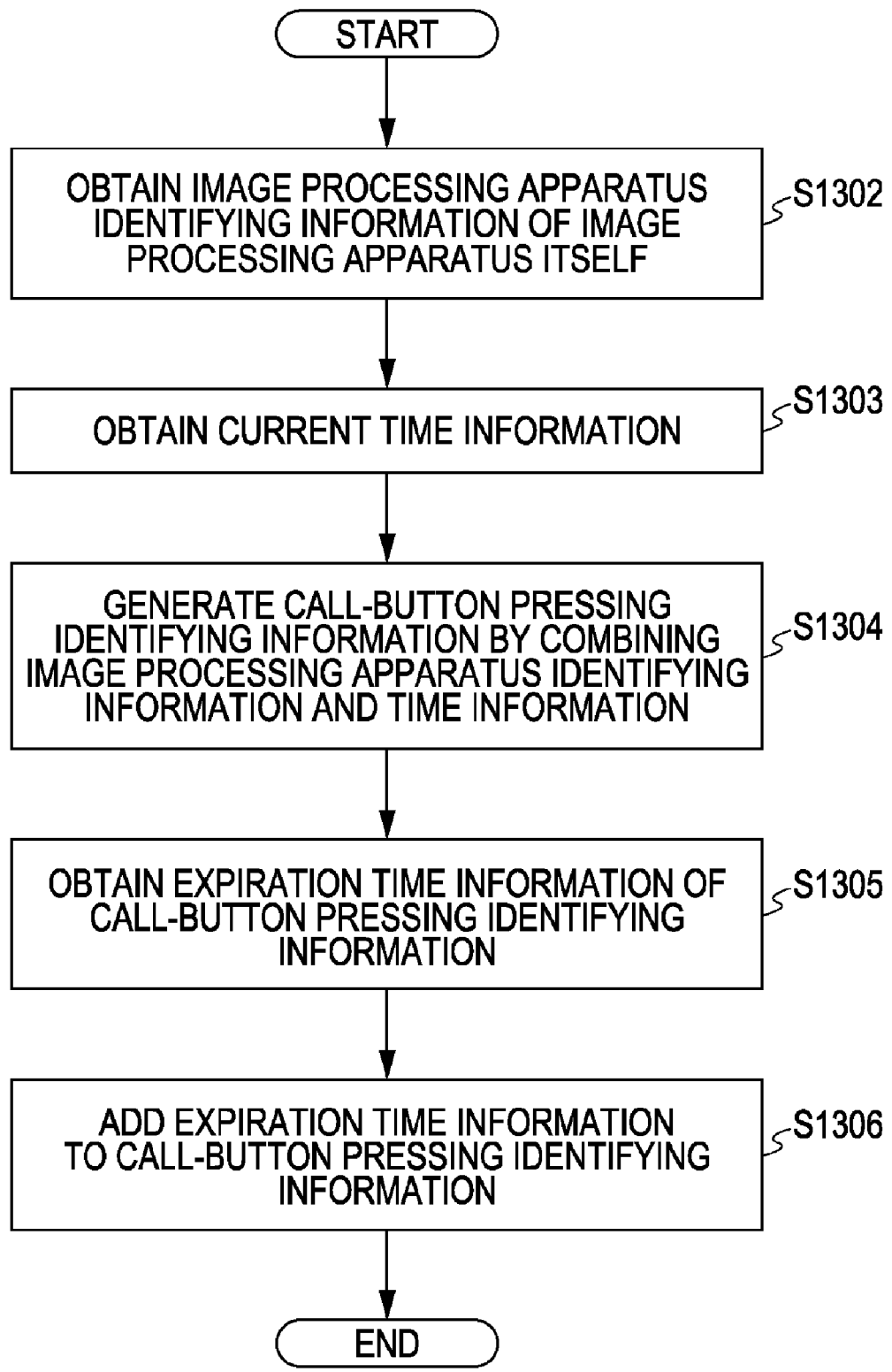
FIG. 9 is a flowchart illustrating an example of a fourth data processing step of the image processing apparatus according to the first exemplary embodiment of the present invention.

FIG. 9 is a flowchart illustrating an example of fourth data processing of the image processing apparatus according to this exemplary embodiment. This example shows processing of generating call-button pressing identifying information including expiration time information using the image processing apparatus 10A.

Note that steps S1302 to S1306 are realized by executing a control program stored in the storage unit 106 using the controller 103 included in the image processing apparatus 10A.

When starting the processing, the image processing apparatus 10A obtains image processing apparatus identifying information of itself from the storage unit 106 in step S1302.

In step S1303, the image processing apparatus 10A obtains current time information. In step S1304, the image processing apparatus 10A generates call-button pressing identifying information by combining the image processing apparatus identifying information and the time information.

In step S1305, the image processing apparatus 10A obtains expiration information of the call-button pressing identifying information from the storage unit 106. Then, in step S1306, the image processing apparatus 10A adds the expiration time information to the call-button pressing identifying information.

The image processing apparatus 10A thus terminates the processing. Note that information on a time point when the call-button pressing identifying information is invalidated may be set as the expiration time information. In this case, information on a time point reached after a predetermined period has past from a time point when the call button CB is pressed is set as the expiration time information.

Figure 10:
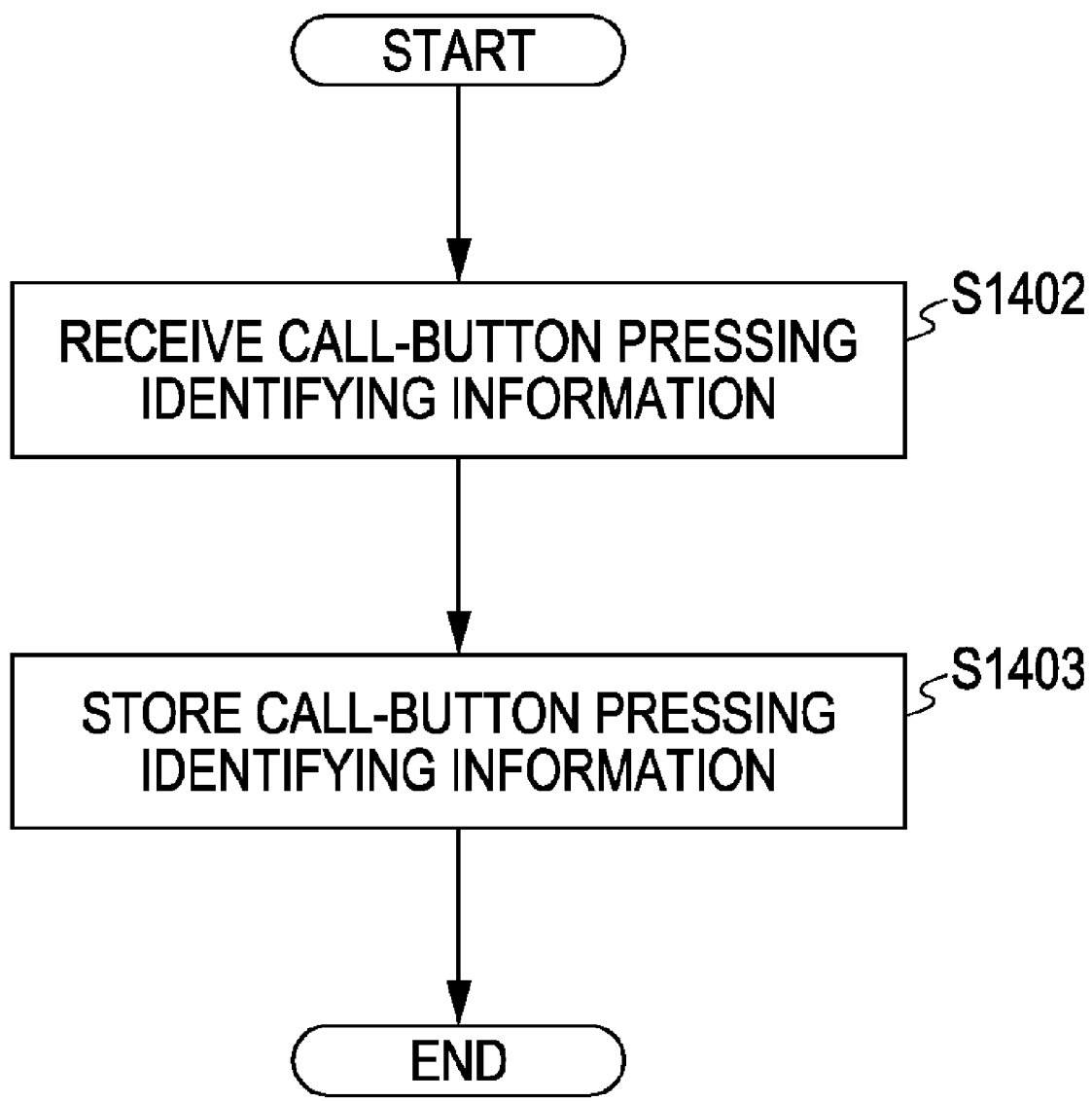
FIG. 10 is a flowchart illustrating an example of a fifth data processing step of the image processing apparatus according to the first exemplary embodiment of the present invention.

FIG. 10 is a flowchart illustrating an example of fifth data processing of the image processing apparatus according to this exemplary embodiment. This example shows processing of the image processing apparatus 10B when receiving the call-button pressing identifying information. Note that, in the first exemplary embodiment, an operation of the image processing apparatus 10B when receiving the call-button pressing identifying information from the image processing apparatus 10A will be described.

Note that steps S1402 and S1403 are realized by executing a control program stored in the storage unit 106 using the controller 103 included in the image processing apparatus 10B.

When starting this processing, the image processing apparatus 10B receives the call-button pressing identifying information in step S1402, and stores the call-button pressing identifying information in the storage unit 106 in step S1403. This processing is thus terminated.

Figure 11:
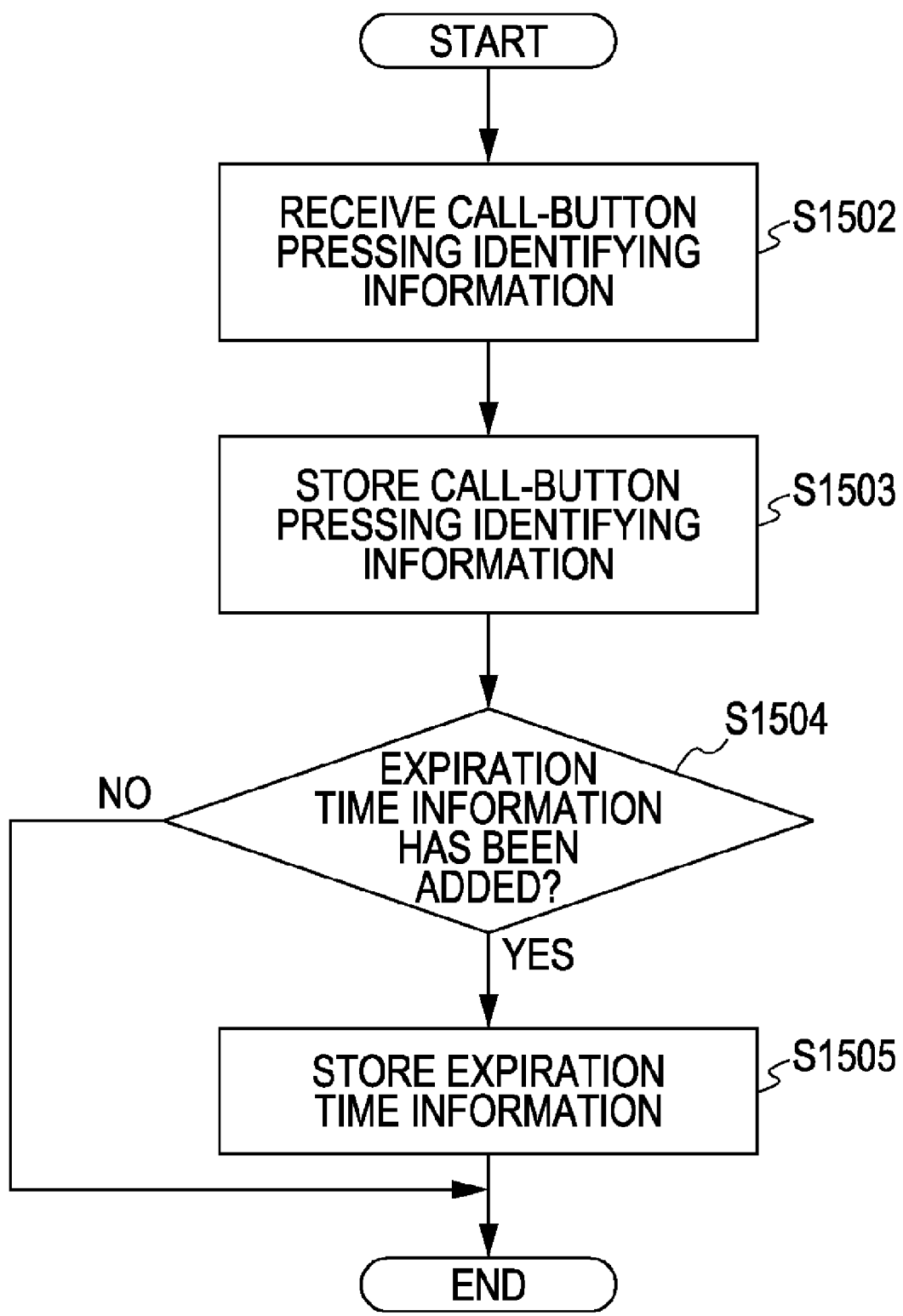
FIG. 11 is a flowchart illustrating an example of a sixth data processing step of the image processing apparatus according to the first exemplary embodiment of the present invention.

FIG. 11 is a flowchart illustrating an example of sixth data processing of the image processing apparatus according to this exemplary embodiment. This example shows processing of the image processing apparatus 10B when receiving the call-button pressing identifying information including the expiration time information.

Note that an operation performed when the image processing apparatus 10B receives the call-button pressing identifying information including the expiration time information in the first exemplary embodiment will be described.

Note that steps S1502 to S1505 are realized by executing a control program stored in the storage unit 106 using the controller 103 included in the image processing apparatus 10B.

When starting this processing, the image processing apparatus 10B receives the call-button pressing identifying information in step S1502, and stores the call-button pressing identifying information in the storage unit 106 in step S1503.

In step S1504, the image processing apparatus 10B determines whether the call-button pressing identifying information includes expiration time information. When the determination is affirmative in step S1504, the process proceeds to step S1505.

On the other hand, when the determination is negative in step S1504, this processing is terminated.

In step S1505, the image processing apparatus 10B stores the expiration time information in the storage unit 106, and starts a timer function. This processing is thus terminated.

Figure 12:
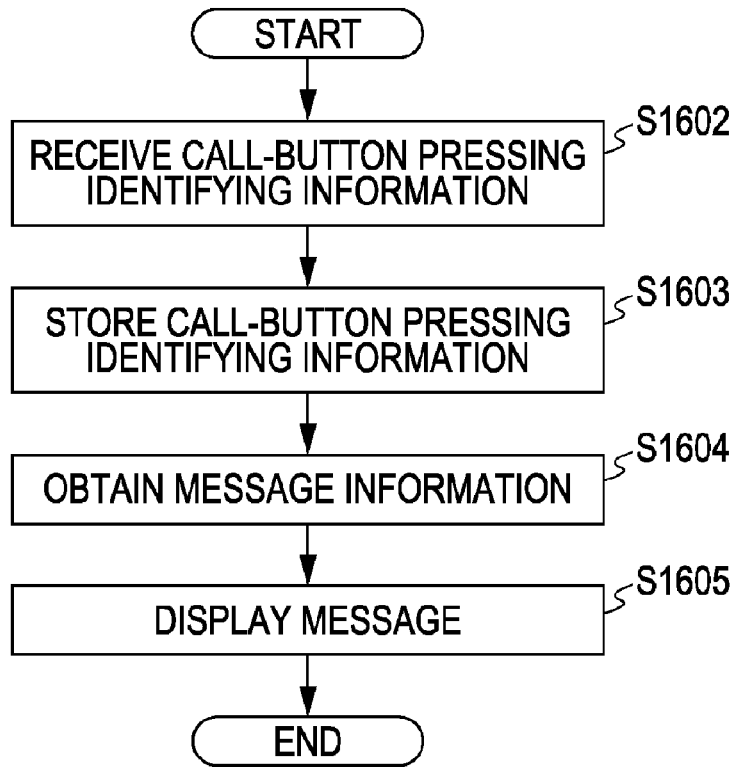
FIG. 12 is a flowchart illustrating an example of a seventh data processing step of the image processing apparatus according to the first exemplary embodiment of the present invention.

FIG. 12 is a flowchart illustrating an example of seventh data processing of the image processing apparatus according to this exemplary embodiment. This example shows processing performed when the image processing apparatus 10B which received the call-button pressing identifying information displays a message in the operation unit 101.

Note that steps S1602 to S1605 are realized by executing a control program stored in the storage unit 106 using the controller 103 included in the image processing apparatus 10B.

The image processing apparatus 10B which received the call-button pressing identifying information displays a message "requested service person to perform maintenance" in the operation unit 101.

The massage is displayed so as to indicate that another image information apparatus included in the maintenance area 15 has already requested maintenance using a call button thereof.

This prompts the user who needs help of a service person to press a call button. Thus, an image processing apparatus including the pressed call button is checked by a service person simultaneously with the maintenance of the other image processing apparatus which has already requested the maintenance using the call button thereof. Note that in a case where an image processing apparatus having a small problem to the extent that usual operation of the image processing apparatus is not disturbed is detected, it is not necessary for the user to call the service person.

However, when the service person visits the user for maintenance, the user may also ask the service person to check such a small problem.

Examples of the small problem here includes a problem in which a wheel of an apparatus is accidentally detached, for example, which does not relate to printing processing, and a problem in which quality of an image is slightly deteriorated.

For the service person, it is highly possible that the image processing apparatus 10B arranged near the image processing apparatus 10A in the maintenance area 15 is checked simultaneously with checking of the image processing apparatus 10A. Accordingly, maintenance operation is efficiently performed.

When starting this processing, the image processing apparatus 10B receives the call-button pressing identifying information in step S1602, and stores the call-button pressing identifying information in the storage unit 106 in step S1603.

The image processing apparatus 10B obtains the message to be displayed in the operation unit 101 from the storage unit 106 in step S1604, and displays the obtained message in an operation panel in step S1605. This processing is thus terminated.

Note that the message is not displayed when the expiration time of the call-button pressing identifying information is reached or when a signal representing start of maintenance performed by a service person is detected.

Note that the message may be displayed in the operation unit 101 of the image processing apparatus 10A which first detected the pressing of the call button CB.

Figure 13:
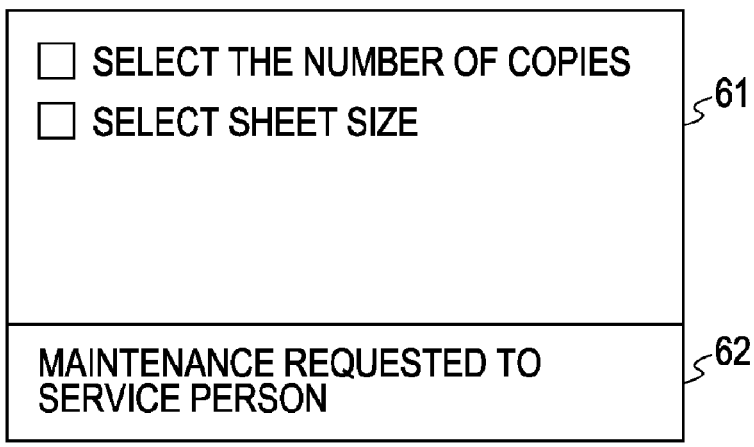
FIG. 13 is a diagram illustrating an example of a user interface displayed in the operation unit of the image processing apparatus shown in FIG. 1.

FIG. 13 is a diagram illustrating an example of a user interface displayed in the operation unit 101 of the image processing apparatus 10A shown in FIG. 1. This example shows a message display screen displayed in the display unit of the operation unit 101 included in the image processing apparatus 10A shown. A displayed message is not limited to a message shown in FIG. 13 as long as the message indicates that a maintenance request has already been notified to a service person from an image processing apparatus other than the image processing apparatus 10A. Furthermore, a request starting time and management information of an image processing apparatus which issued a maintenance request may be displayed along with the message.

In FIG. 13, a screen 60 in the operation panel includes a normal display region 61 and a message display region 62. In the normal display region 61, a selection of the number of copies and a selection of a sheet size are displayed at a time of copying.

In the message display region 62, a message is displayed when call-button pressing identifying information is received by pressing the call button CB in the image processing apparatus 10A or other image processing apparatuses.

Figure 14:
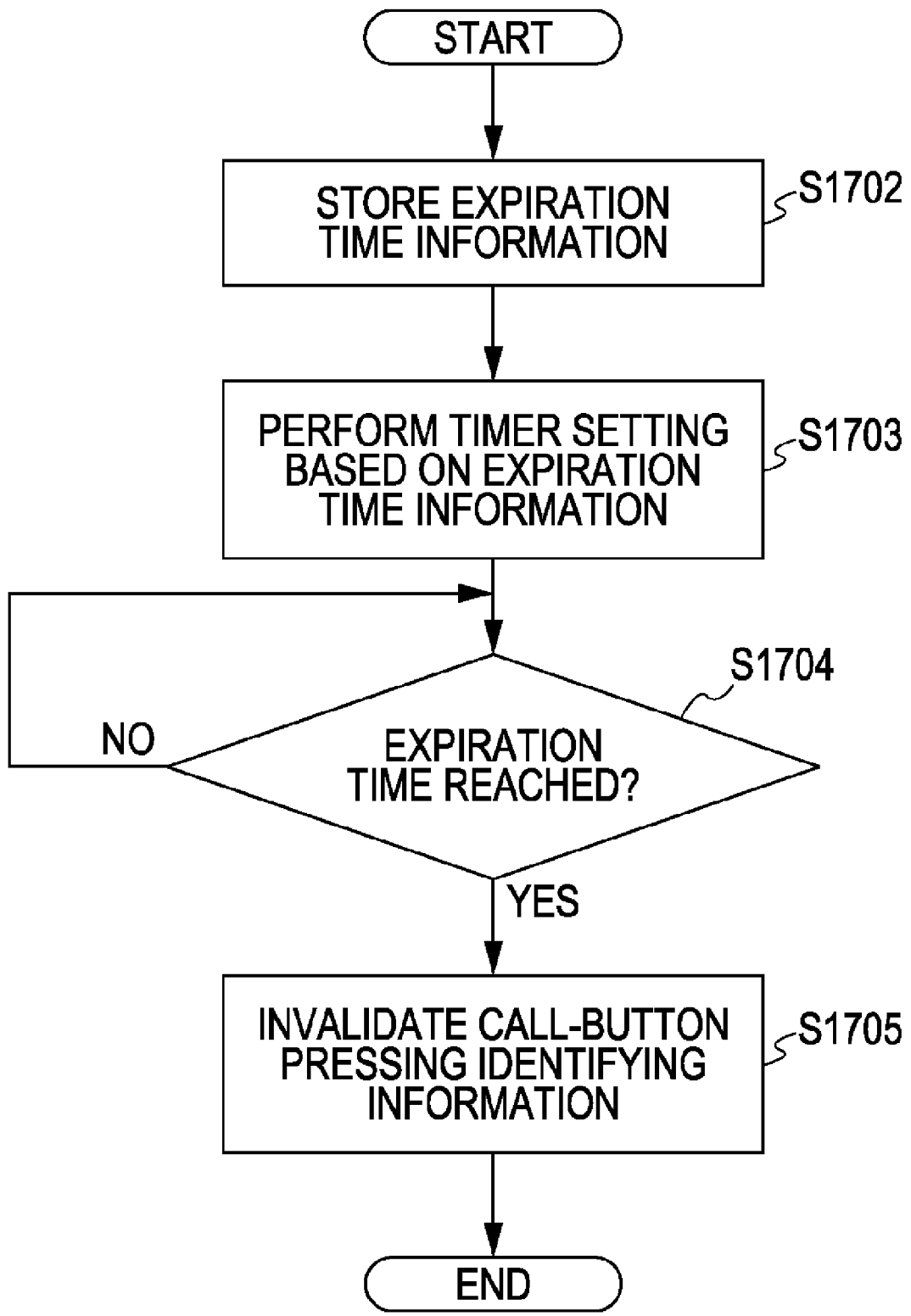
FIG. 14 is a flowchart illustrating an example of an eighth data processing step of the image processing apparatus according to the first exemplary embodiment of the present invention.

FIG. 14 is a flowchart illustrating an example of eighth data processing of the image processing apparatus according to this exemplary embodiment. This example shows processing of deleting call-button pressing identifying information including expiration time information in the image processing apparatus. This processing may be applicable to both the image processing apparatuses 10A and 10B, and a case where the processing is performed using the image processing apparatus 10A will be described as an example. Note that steps S1702 to S1705 are realized by executing a control program stored in the storage unit 106 using the controller 103 included in the image processing apparatus 10A.

When starting the processing, the image processing apparatus 10A receives the call-button pressing identifying information and the expiration time information and stores them in the storage unit 106 in step S1702.

In step S1703, the image processing apparatus 10A sets a timer in accordance with the expiration time information. In step S1704, the image processing apparatus 10A determines whether an expiration time of the call-button pressing identifying information is reached by performing processing of the call-button pressing information management unit 104. When the determination is affirmative in step S1704, the process proceeds to step S1705.

On the other hand, when the determination is negative in step S1704, the processing in step S1704 is repeated.

In step S1705, the call-button pressing identifying information included in the storage unit 106 of the image processing apparatus 10A is invalidated. Here, when a message has been displayed in response to reception of the call-button pressing identifying information, the message is cancelled, and this processing is terminated.

Figure 15:
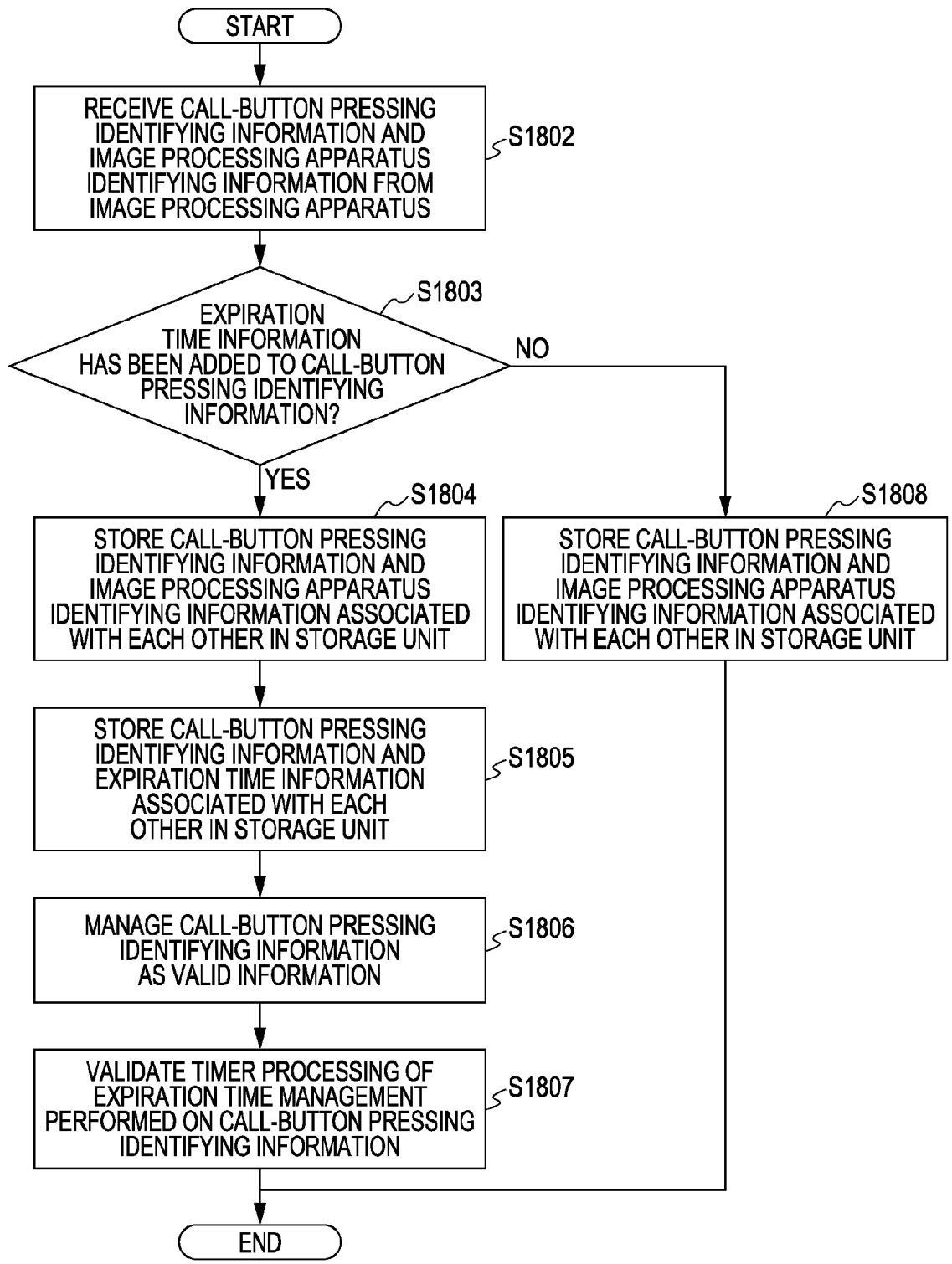
FIG. 15 is a flowchart illustrating an example of a first data processing step of the management apparatus according to the first exemplary embodiment of the present invention.

FIG. 15 is a flowchart illustrating an example of first data processing of the management apparatus according to the first exemplary embodiment. This example shows processing performed when the management apparatus 20 received call-button pressing identifying information. Note that steps S1802 to S1808 are realized by executing a control program stored in the storage unit 202 using the controller 203 included in the management apparatus 20 shown in FIG. 1.

When starting this processing, the management apparatus 20 receives call-button pressing identifying information and image processing apparatus identifying information from the image processing apparatuses 10A and 10B in step S1802. In step S1803, the management apparatus 20 determines whether the call-button pressing identifying information includes expiration time information added thereto. When the determination is affirmative in step S1803, the process proceeds to step S1804.

On the other hand, when the determination is negative in step S1803, the process proceeds to step S1808.

In step S1804, the management apparatus 20 associates the call-button pressing identifying information with the image processing apparatus identifying information through processing performed using the call-button pressing information management unit 205, and stores them in the storage unit 202.

In step S1805, the management apparatus 20 associates the call-button pressing identifying information with the expiration time information and stores them in the storage unit 202.

In step S1806, the management apparatus 20 manages the call-button pressing identifying information as valid information. In step S1807, the management apparatus 20 validates timer processing performed for managing the expiration time of the call-button pressing identifying information. This processing is thus terminated.

On the other hand, in step S1808, the management apparatus 20 associates the call-button pressing identifying information and the image processing apparatus identifying information and stores them in the storage unit 202. The processing is thus terminated.

Note that the expiration time information may indicate a time point when the call-button pressing identifying information is invalidated.

When a service person is assigned to an image processing apparatus, the management apparatus 20 associates service person information which is managed in the management apparatus 20 with the call-button pressing identifying information.

Accordingly, when receiving from the image processing apparatus 10B the call-button pressing identifying information which is the same as the call-button pressing identifying information which has already been received from the image processing apparatus 10A, the management apparatus 20 assigns a service person who has been associated with the call-button pressing identifying information to the image processing apparatus 10B to be repaired.

FIG. 16 is a flowchart illustrating an example of second data processing of the management apparatus according to this exemplary embodiment. This example shows processing of the management apparatus 20 when the expiration time of the call-button pressing identifying information is reached. Note that steps S1902 and S1903 are realized by executing a control program stored in the storage unit 202 using the controller 203 included in the management apparatus 20 shown in FIG. 1.

When starting this processing, the management apparatus 20 detects that the call-button pressing identifying information is no longer valid through processing performed using the call-button pressing information management unit 205 in step S1902.

In step S1903, the management apparatus 20 manages the call-button pressing identifying information as invalid information. This processing is thus terminated.

Second Exemplary Embodiment

FIG. 17 is a block diagram illustrating an example of a monitoring system according to a second exemplary embodiment of the present invention. The monitoring system includes a plurality of image processing apparatuses each of which has image processing information such as an IP address of the other image processing apparatuses in the storage unit 106. Here, the storage unit 106 stores therein group information used to manage the plurality of image processing apparatuses as a group.

The monitoring system includes two image processing apparatuses, that is, an image processing apparatus 10A, a call button CB thereof being pressed first, and an image processing apparatus 10B which receives call-button pressing identifying information from the image processing apparatus 10A. The monitoring system further includes the management apparatus 20. The management apparatus 20 makes an arrangement for dispatching a service person having a mobile terminal 40 to be operated in accordance with a maintenance request transmitted from the image processing apparatus 10B which received the maintenance request transmitted from the image processing apparatus 10A on the basis of a control described below. Here, the term "arrangement" includes an arrangement made by e-mail and an arrangement made by a phone, for example.

In FIG. 17, the call button CB in the image processing apparatus 10A is pressed first. When detecting pressing of the call button CB, the image processing apparatus 10A generates call-button pressing identifying information.

Then, the image processing apparatus 10A specifies the image processing apparatus 10B using image processing apparatus information stored in a storage unit 106, and transmits the call-button pressing identifying information to the image processing apparatus 10B (1). Here, the image processing apparatus information corresponds to information on access to the image processing apparatus.

Furthermore, the image processing apparatus 10A transmits the call-button pressing identifying information and the image processing apparatus identifying information of the image processing apparatus 10A to the management apparatus 20 (2).

The image processing apparatus 10B receives the call-button pressing identifying information and stores the call-button pressing identifying information in the storage unit 106. When detecting pressing of a call button CB of the image processing apparatus 10B, the image processing apparatus 10B transmits the call-button pressing identifying information received from the image processing apparatus 10A and image processing apparatus identifying information of the image processing apparatus 10B to the management apparatus 20.

Note that the management apparatus 20 manages the call-button pressing identifying information and the image processing apparatus identifying information by associating them with each other. Furthermore, the management apparatus 20 associates the call-button pressing identifying information with a service person, and makes an arrangement for dispatching the service person to the location where the image processing apparatus 10, the call button CB thereof having been pressed.

Since the image processing apparatus 10A and the image processing apparatus 10B are associated with each other by the identical call-button pressing identifying information, the same service person is assigned to the image processing apparatuses 10A and 10B.

In a case where the image processing apparatus 10A requires restocking of supplies or in a case where paper jams are likely to frequently occur in the image processing apparatus 10A, the service person and the user may deal with those problems at the time of maintenance. In order to assist the service person in determining what kinds of maintenance should be made at the same time, detections of information on the latest state of the image processing apparatus 10A and information on the latest state of image processing apparatus 10B may be added to the processing of (2) and the processing of (3).

Figure 18:
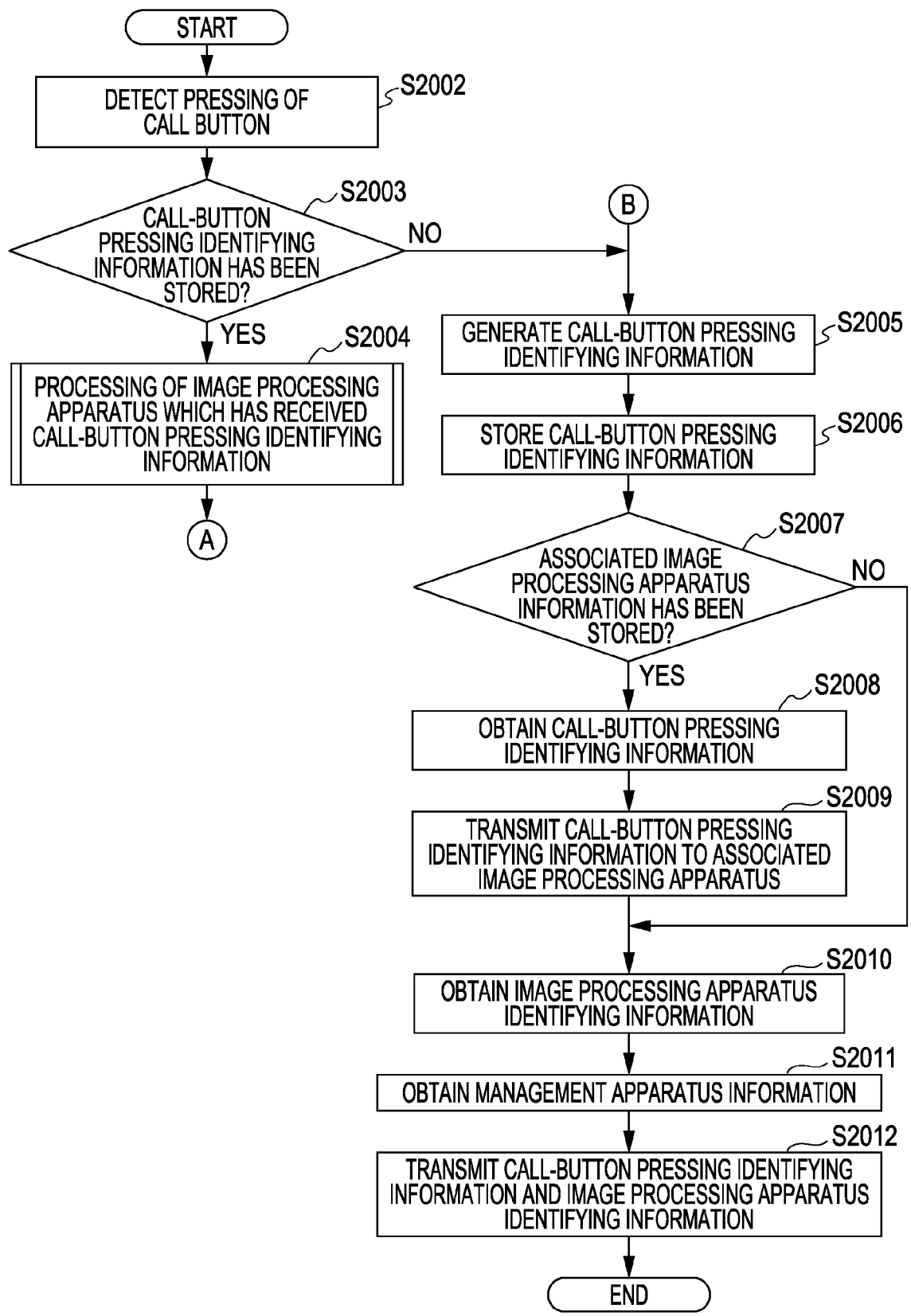
FIG. 18 is a flowchart illustrating an example of a ninth data processing step of the image processing apparatus according to the second exemplary embodiment of the present invention.

FIG. 18 is a flowchart illustrating an example of ninth data processing of the image processing apparatus according to this exemplary embodiment. This example shows processing performed when pressing of the call-button pressing identifying information is detected in the image processing apparatus 10A.

The image processing apparatus 10A does not have call-button pressing identifying information at a time when the call button CB is pressed, but generates call-button pressing identifying information by itself.

Note that steps S2002 to S2012 are realized by executing a control program stored in the storage unit 106 using the controller 103 included in the image processing apparatus 10A.

When starting this processing, the image processing apparatus 10A detects pressing of the call button CB in step S2002.

In step S2003, the image processing apparatus 10A determines whether call-button pressing identifying information is included in the storage unit 106. When the determination is affirmative in step S2003, the process proceeds to step S2004.

On the other hand, when the determination is negative in step S2003, the process proceeds to step S2005.

Processing in step S2004 corresponds to processing of an image processing apparatus which has the call-button pressing identifying information, that is, processing of the image processing apparatus 10B which received the call-button pressing identifying information from the image processing apparatus 10A. After the processing in step S2004, the process proceeds to a destination A shown in FIG. 7.

In step S2005, the image processing apparatus 10A generates call-button pressing identifying information. In step S2006, the image processing apparatus 10A stores the generated call-button pressing identifying information in the storage unit 106.

In step S2007, the image processing apparatus 10A determines whether the storage unit 106 includes image processing apparatus information including information on access to another image processing apparatus. When the determination is affirmative in step S2007, the process proceeds to step S2008.

On the other hand, when the determination is negative in step S2007, the process proceeds to step S2010.

In step S2008, the image processing apparatus 10A obtains the call-button pressing identifying information from the storage unit 106. In step S2009, the image processing apparatus 10A transmits the call-button pressing identifying information to another image processing apparatus (the image processing apparatus 10B, for example) registered in the image processing apparatus information.

The image processing apparatus 10A obtains the image processing apparatus identifying information from the storage unit 106 in step S2010, and obtains management apparatus information in step S2011. The management apparatus information corresponds to information on access to the management apparatus 20.

Then, in step S2012, the image processing apparatus 10A transmits the call-button pressing identifying information and the image processing apparatus identifying information to the management apparatus 20 so as to notify the management apparatus 20 of the detection of the pressing of the call button CB of the image processing apparatus 10A. Here, information on a state of the image processing apparatus 10A may be additionally transmitted. The process is thus terminated.

Note that a destination B of FIG. 18 denotes a destination of step S1108 of FIG. 7.

Processing of the image processing apparatus 10B which receives the call-button pressing identifying information from the image processing apparatus 10A is the same as the processing of the first exemplary embodiment shown in FIG. 7.

As with the first exemplary embodiment, the image processing apparatus 10B of the second exemplary embodiment includes the call button CB as shown in FIG. 5, and generates call-button pressing identifying information through processing shown in FIGS. 8 and 9.

Processing flows of the image processing apparatus 10B after receiving the call-button pressing identifying information in the second exemplary embodiment are also the same as those shown in FIGS. 10 to 14.

Furthermore, processing flows of the management apparatus 20 after receiving the call-button pressing identifying information are the same as those shown in FIGS. 15 and 16.

In the second exemplary embodiment, image processing apparatuses which share call-button pressing identifying information with each other are included in the same group. Each of the image processing apparatuses includes image processing apparatus identifying information such as an IP address serving as group information in a storage unit 106 thereof. Here, the storage unit 106 functions as a second storage unit which stores the group information.

Accordingly, when a plurality of image processing apparatuses of a customer are managed by dividing them into some groups for management system reasons or organization reasons of the customer, call-button pressing identifying information is shared by image processing apparatuses in the same group.

Third Exemplary Embodiment

Figure 19:
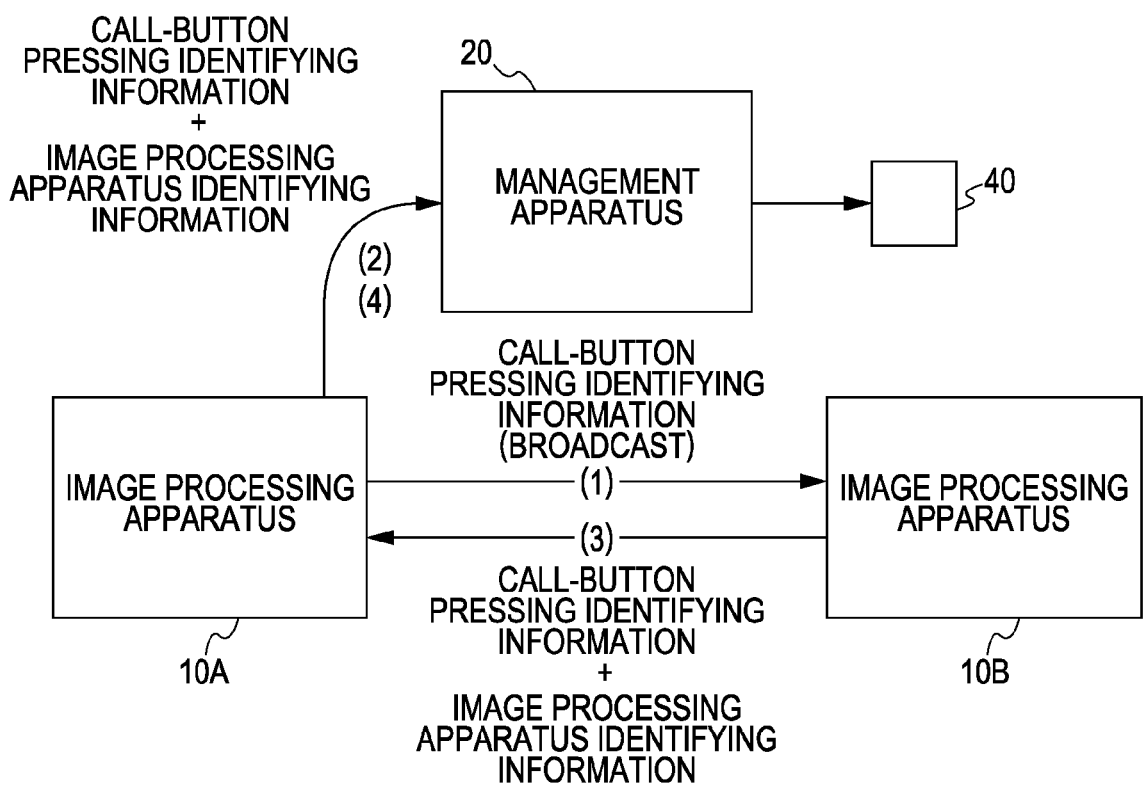
FIG. 19 is a block diagram illustrating an example of a monitoring system according to a third exemplary embodiment of the present invention.

FIG. 19 is a block diagram illustrating an example of a monitoring system according to a third exemplary embodiment of the present invention.

In this exemplary embodiment, the monitoring system includes a plurality of image processing apparatuses each of which does not have image processing information such as an IP address of the other image processing apparatuses.

In this example, the monitoring system includes two image processing apparatuses, that is, an image processing apparatus 10A, a call button CB thereof being pressed first, and an image processing apparatus 10B which receives call-button pressing identifying information from the image processing apparatus 10A. The monitoring system further includes the management apparatus 20 which communicates with the image processing apparatuses 10A and 10B.

Note that, in this exemplary embodiment, the image processing apparatus 10A is selected from among the image processing apparatuses included in a maintenance area 15 so as to communicate with the management apparatus 20.

The management apparatus 20 makes an arrangement for dispatching a service person having a mobile terminal 40 to be operated in accordance with a maintenance request transmitted from the image processing apparatus 10B which received the maintenance request from the image processing apparatus 10A on the basis of a control described below. Here, the "arrangement" includes an arrangement made by e-mail and an arrangement made by a phone, for example.

First, the call button CB of the image processing apparatus 10A is pressed. When detecting the pressing of the call button CB, the image processing apparatus 10A generates call-button pressing identifying information.

Then, the image processing apparatus 10A searches the maintenance area 15 for another image processing apparatuses by broadcast. When detecting the image processing apparatus 10B, the image processing apparatus 10A transmits the generated call-button pressing identifying information to the image processing apparatus 10B (1).

Then, the image processing apparatus 10A transmits the call-button pressing identifying information and image processing apparatus identifying information of the image processing apparatus 10A to the management apparatus 20 (2). When receiving the call-button pressing identifying information, the image processing apparatus 10B stores the call-button pressing identifying information and image processing apparatus information of the image processing apparatus 10B in a storage unit 106.

The image processing apparatus information of the image processing apparatus 10B corresponds to information, such as an IP address, used for data transmission. When detecting pressing of a call button CB of the image processing apparatus 10B, the image processing apparatus 10B transmits the call-button pressing identifying information received from the image processing apparatus 10A and image processing apparatus identifying information of the image processing apparatus 10B to the image processing apparatus 10A (3).

After notifying the image processing apparatus 10B of the call-button pressing identifying information, the image processing apparatus 10A transmits the call-button pressing identifying information and the image processing apparatus identifying information of the image processing apparatus 10B received from the image processing apparatus 10B to the management apparatus 20 (4). Here, processing of receiving the call-button pressing identifying information of the image processing apparatus 10B from the image processing apparatus 10B after notifying the image processing apparatus 10B of the call-button pressing identifying information corresponds to a second reception function of the image processing apparatus 10A.

The management apparatus 20 manages the call-button pressing identifying information and the image processing apparatus identifying information by associating them with each other. Furthermore, the management apparatus 20 associates the call-button pressing identifying information with a service person and makes an arrangement for dispatching the service person to the location where the image processing apparatus 10A, the call button CB thereof having been pressed.

Since the image processing apparatus 10A and the image processing apparatus 10B are associated with each other by the identical call-button pressing identifying information, the same service person is assigned to the image processing apparatuses 10A and 10B.

In a case where the image processing apparatus 10A requires restocking of supplies or in a case where paper jams are likely to frequently occur in the image processing apparatus 10A, the service person and the user may deal with those problems at the time of maintenance.

Accordingly, in order to assist the service person in determining what kinds of maintenance should be made at the same time, detections of information on the latest state of the image processing apparatus 10A and information on the latest state of image processing apparatus 10B may be added to the processing of (2), the processing of (3), and the processing of (4) in the third exemplary embodiment.

Figure 20:
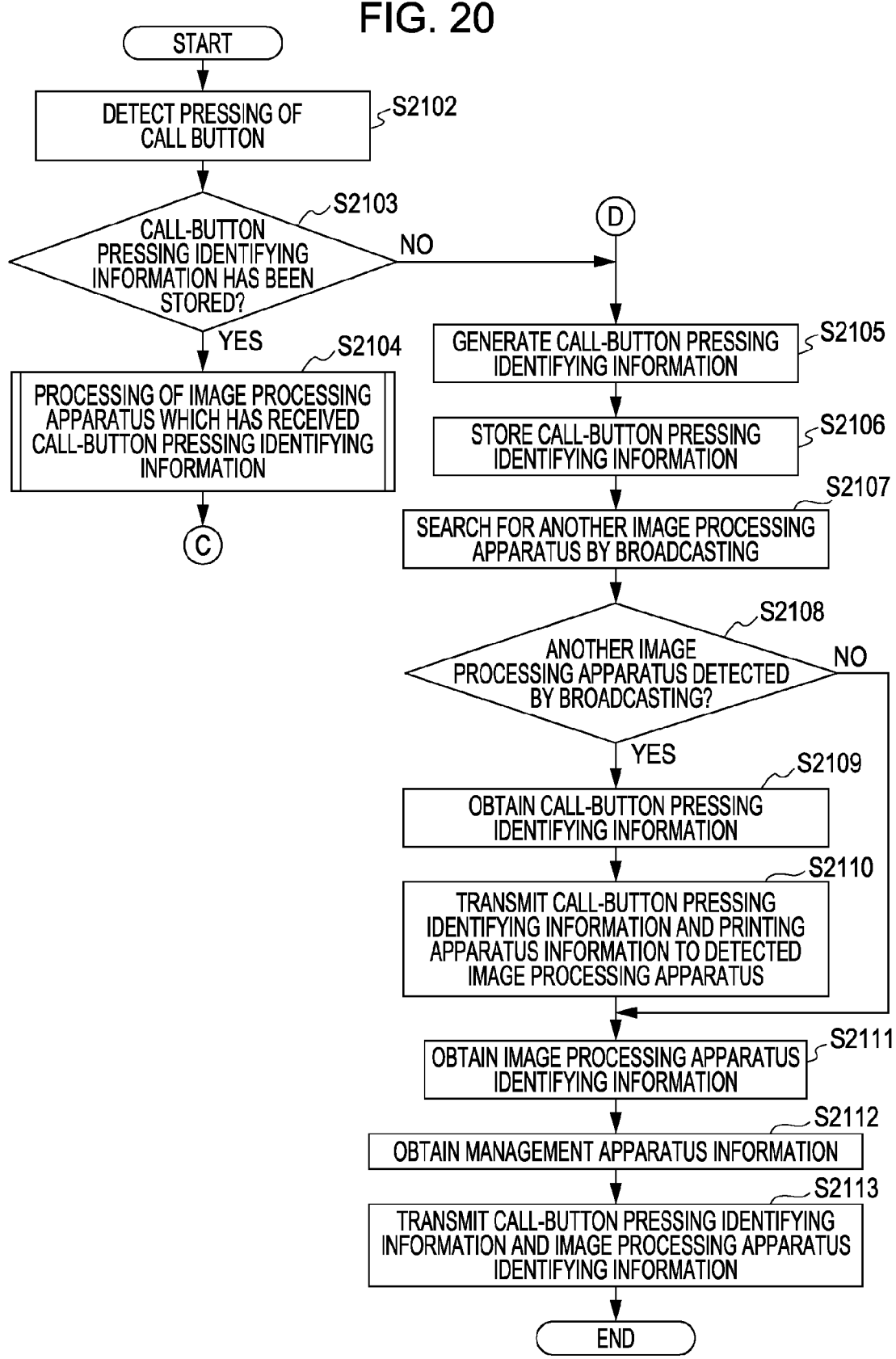
FIG. 20 is a flowchart illustrating an example of a 10th data processing step of the image processing apparatus according to the third exemplary embodiment of the present invention.

FIG. 20 is a flowchart illustrating an example of 10th data processing of the image processing apparatus according to this exemplary embodiment. This example shows processing performed when pressing of the call button CB of the image processing apparatus 10A is detected in the monitoring system shown in FIG. 19.

The image processing apparatus 10A does not have call-button pressing identifying information at a time when the call button CB is pressed, but generates call-button pressing identifying information by itself.

Note that steps S2102 to S2113 are realized by executing a control program stored in the storage unit 106 using the controller 103 included in the image processing apparatus 10A.

When starting this processing, the image processing apparatus 10A detects pressing of the call button CB in step S2102.

In step S2103, the image processing apparatus 10A determines whether the storage unit 106 includes call-button pressing identifying information. When the determination is affirmative in step S2103, the process proceeds to step S2104.

On the other hand, when the determination is negative in step S2103, the process proceeds to step S2105.

Processing in step S2104 corresponds to processing of an image processing apparatus which has the call-button pressing identifying information, that is, processing of the image processing apparatus 10B which received the call-button pressing identifying information from the image processing apparatus 10A. After the processing in step S2104, the process proceeds to a destination C shown in FIG. 21.

On the other hand, in step S2105, the image processing apparatus 10A generates call-button pressing identifying information, and stores the generated call-button pressing identifying information in the storage unit 106 in step S2106.

In step S2107, the image processing apparatus 10A searches the maintenance area 15 for another image processing apparatus (the image processing apparatus 10B) by broadcast.

In step S2108, the image processing apparatus 10A determines whether another image processing apparatus, that is, the image processing apparatus 10B was detected. When the determination is affirmative in step S2108, the process proceeds to step S2109.

On the other hand, when the determination is negative in step S2108, the process proceeds to step S2111.

In step S2109, the image processing apparatus 10A obtains the call-button pressing identifying information from the storage unit 106. Then, in step S2110, the image processing apparatus 10A transmits the call-button pressing identifying information and image processing apparatus information to the detected image processing apparatus 10B. The image processing apparatus information corresponds to information on access to the image processing apparatus 10B.

Then, the image processing apparatus 10A obtains image processing apparatus identifying information from the storage unit 106 in step S2111, and obtains management apparatus information in step S2112. Here, the management apparatus information corresponds to information on access to the management apparatus 20.

In step S2113, the image processing apparatus 10A transmits the call-button pressing identifying information and the image processing apparatus identifying information to the management apparatus 20.

Here, the image processing apparatus 10A transmits information on a state of the image processing apparatus 10A to the management apparatus 20 in addition to the call-button pressing identifying information and the image processing apparatus identifying information. The process is thus terminated.

Figure 21:
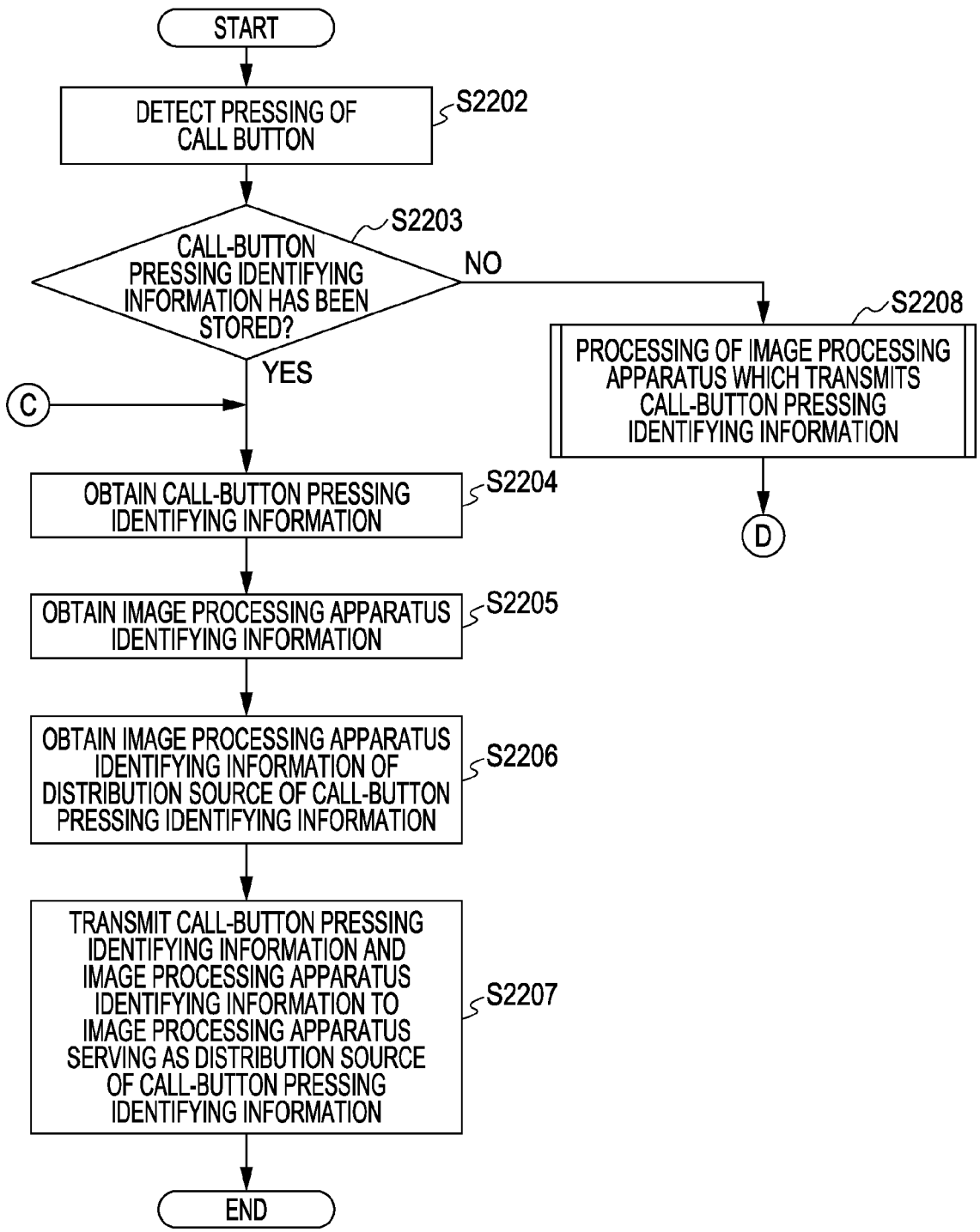
FIG. 21 is a flowchart illustrating an example of an 11th data processing step of the image processing apparatus according to the third exemplary embodiment of the present invention.

Note that a destination D of FIG. 20 denotes a destination of step S2208 of FIG. 21.

FIG. 21 is a flowchart illustrating an example of 11th data processing of the image processing apparatus according to this exemplary embodiment. This example shows processing performed when the image processing apparatus 10B detects pressing of the call button CB of the image processing apparatus 10B.

Note that when detecting the pressing of the call button CB, the image processing apparatus 10B has already stored therein the call-button pressing identifying information received from the image processing apparatus 10A.

Note that steps S2202 to S2208 are realized by executing a control program stored in the storage unit 106 using the controller 103 included in the image processing apparatus 10B.

When starting the processing, the image processing apparatus 10B detects pressing of the call button CB in step S2202.

In step S2203, the image processing apparatus 10B determines whether the image processing apparatus 10B has call-button pressing identifying information. When the determination is affirmative in step S2203, the process proceeds to step S2204.

On the other hand, when the determination is negative in step S2203, the process proceeds to step S2208.

Processing in step S2208 corresponds to processing of an image processing apparatus which does not have call-button pressing identifying information, that is, processing of the image processing apparatus 10A which generates call-button pressing identifying information by itself. After the processing in step S2208, the process proceeds to the destination D shown in FIG. 20.

In step S2204, the image processing apparatus 10B obtains the call-button pressing identifying information from the storage unit 106. Then, the image processing apparatus 10B obtains image processing apparatus identifying information from the storage unit 106 in step S2205, and obtains image processing apparatus information which transmitted the call-button pressing identifying information in step S2206. Here, the image processing apparatus information corresponds to information on access to the image processing apparatus 10B.

Then, in step S2207, the image processing apparatus 10B transmits the call-button pressing identifying information and the image processing apparatus identifying information to the image processing apparatus 10A so as to notify the image processing apparatus 10A of the detection of the call button CB of the image processing apparatus 10B. Here, information on a state of the image processing apparatus 10B may be transmitted in addition to the call-button pressing identifying information and the image processing apparatus identifying information.

The image processing apparatus 10B thus terminates this processing.

Note that the destination C shown in FIG. 21 denotes a destination of step S2104 shown in FIG. 20.

Figure 22:
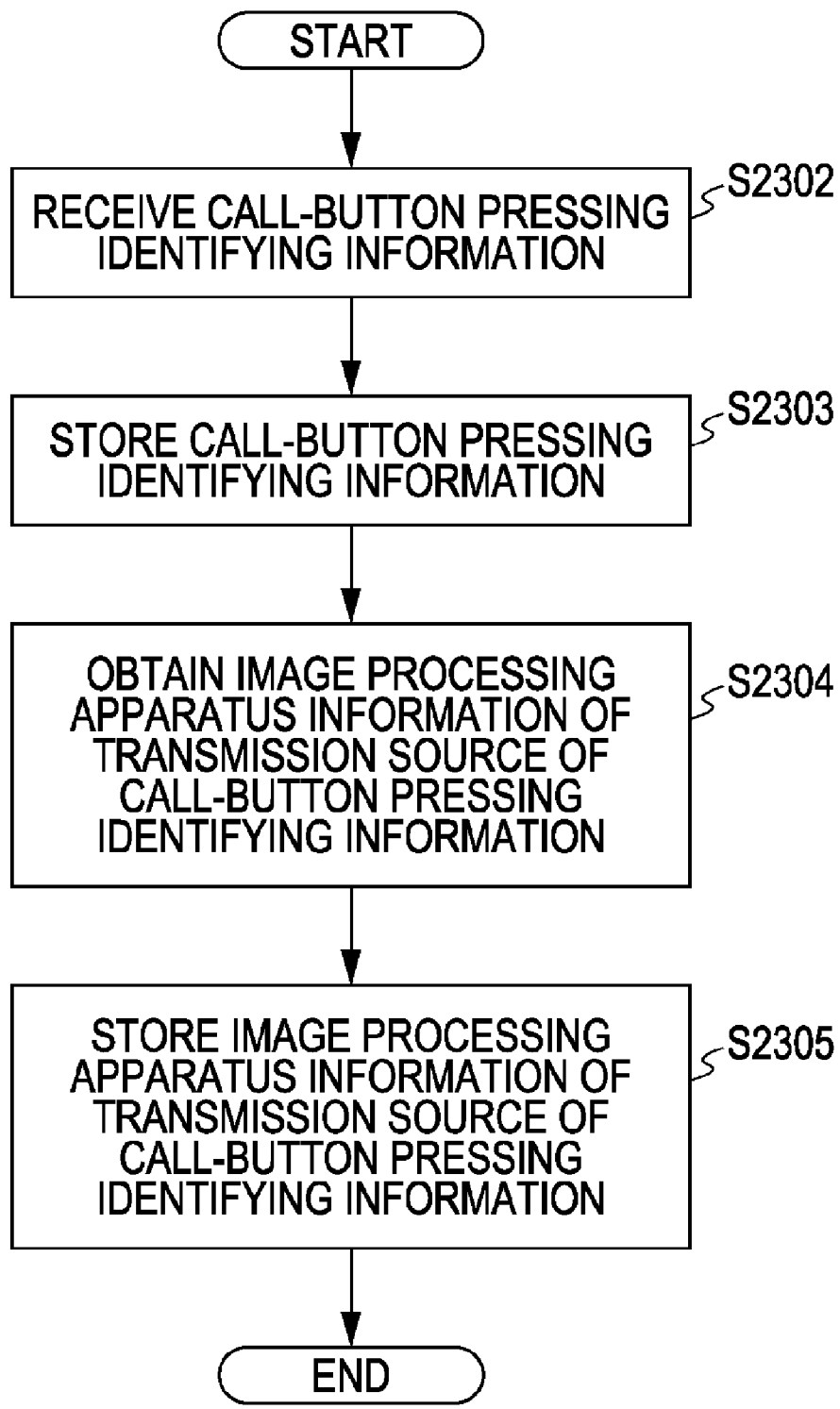
FIG. 22 is a flowchart illustrating an example of a 12th data processing step of the image processing apparatus according to the third exemplary embodiment of the present invention.

FIG. 22 is a flowchart illustrating an example of twelfth data processing of the image processing apparatus according to this exemplary embodiment.

This example shows processing performed when the image processing apparatus 10A received the call-button pressing identifying information. Furthermore, this processing includes processing of obtaining and storing therein image processing apparatus information of the image processing apparatus 10A which generated the call-button pressing identifying information.

The image processing apparatus information corresponds to communication information such as an IP address.

Note that steps S2302 to S2305 are realized by executing a control program stored in the storage unit 106 using the controller 103 included in the image processing apparatus 10A.

When starting this processing, the image processing apparatus 10B receives the call-button pressing identifying information in step S2302, and stores the call-button pressing identifying information in the storage unit 106 in step S2303.

The image processing apparatus 10B obtains image processing apparatus information which transmitted the call-button pressing identifying information in step S2304, and stores the obtained image processing apparatus information in the storage unit 106 in step S2305. This processing is thus terminated.

As with the first and second exemplary embodiments, the image processing apparatus 10A includes the call button CB as shown in FIG. 5 in the third exemplary embodiment, and generates call-button pressing identifying information by the processing shown in FIGS. 8 and 9.

Processing flows of the image processing apparatus 10B after receiving the call-button pressing identifying information are also the same as those shown in FIGS. 10 to 14.

Moreover, processing flows of the management apparatus 20 after receiving the call-button pressing identifying information are the same as those shown in FIGS. 15 and 16.

However, in the third exemplary embodiment, another method may be employed for invalidating the call-button pressing identifying information.

FIG. 23 is a diagram showing a workflow illustrating a state of data processing of the monitoring system of this exemplary embodiment. This example shows processing of invalidating the call-button pressing identifying information.

In this exemplary embodiment, the image processing apparatus 10 (including the image processing apparatuses 10A and 10B) is capable of storing a state of the image processing apparatus 10 when maintenance is completed using a maintenance completion button included therein, for example. Here, the maintenance completion button functions as a second instruction unit. When the maintenance completion button is pressed, work-completion information is issued to the management apparatus 20. Here, the work-completion information includes image processing apparatus identifying information of an image processing apparatus in which maintenance work thereof is completed. The completion information including such information is transmitted from the image processing apparatus in which the maintenance work thereof is completed to the management apparatus 20.

The management apparatus 20 manages a maintenance-completion state of an image processing apparatus which is associated with the call-button pressing identifying information.

In step S2401, the image processing apparatus 10B is brought into a maintenance-completion state. Then, the image processing apparatus 10B issues completion information indicating that maintenance work of the image processing apparatus 10B is completed. The issued completion information includes apparatus identifying information of the image processing apparatus 10B and request identifying information. Note that the image processing apparatus 10A also performs the processing the same as that performed using the image processing apparatus 10B, that is, when the image processing apparatus 10A is brought into a maintenance-completion state, the image processing apparatus 10A issues completion information indicating that maintenance work of the image processing apparatus 10A is completed. In this way, each of the image processing apparatuses 10A and 10B includes a function of issuing completion information. The management apparatus 20 manages a maintenance-work state in accordance with the completion information transmitted from each of the image processing apparatuses 10A and 10B.

In step S2402, the image processing apparatus 10B transmits the maintenance-completion information, the image processing apparatus identifying information, and the call-button pressing identifying information to the image processing apparatus 10A.

In step S2403, the image processing apparatus 10A transmits the maintenance-completion information, the image processing apparatus identifying information, and the call-button pressing identifying information received from the image processing apparatus 10B to the management apparatus 20. In this way, information items are transmitted from the image processing apparatus 10B in which the maintenance work thereof has been completed to the management apparatus 20. Here, a function of transmitting the information items from the image processing apparatus 10B in which the maintenance work thereof is completed to the management apparatus 20 corresponds to a third transmission function.

The management apparatus 20 manages completion of maintenance works (by a dispatched service person) of all image processing apparatuses which are associated with certain call-button pressing identifying information. Here, processing of requesting a service person having a mobile terminal 40 to perform maintenance on the image processing apparatuses associated with the certain call-button pressing identifying information is the same as the processing described above in the foregoing exemplary embodiments. Note that when the management apparatus 20 determines that all maintenance works are completed before a new maintenance request is supplied, that is, the management apparatus 20 determines that a service person moves out of the maintenance area 15, the management apparatus 20 controls processing so that a service person is not arranged for new maintenance requests issued thereafter.

Then, in step S2404, the management apparatus 20 determines whether maintenance of all the image processing apparatuses associated with the call-button pressing identifying information is completed. Here, when the determination is affirmative in step S2404, the management apparatus 20 manages the call-button pressing identifying information as invalid information. Here, the determination of the management apparatus 20 made in step S2404 corresponds to a second determination function.

The management apparatus 20 notifies the image processing apparatus 10A of information on the invalidating of the call-button pressing identifying information managed using the management apparatus 20. This notification may be realized by performing polling using the image processing apparatus 10A to the management apparatus 20. Alternatively, the management apparatus 20 may transmit a deletion instruction to the image processing apparatus 10A in step S2406. This transmission of the deletion instruction corresponds to a deletion instruction transmission function of the management apparatus 20.

The image processing apparatus 10A deletes the call-button pressing identifying information stored therein in step S2405, and notifies the image processing apparatus 10B of the instruction of deletion of the call-button pressing identifying information in step S2407. This is a second notifying function of the image processing apparatus 10A.

In step S2408, the image processing apparatus 10B deletes the call-button pressing identifying information stored therein.

In the third exemplary embodiment, in an environment including a plurality of image processing apparatuses, the image processing apparatus 10A serving as a representative of the plurality of image processing apparatuses manages states of pressings of call buttons of the other image processing apparatuses.

Accordingly, since the states of pressings of call buttons of the plurality of image processing apparatuses are obtained using the image processing apparatus 10A, a person who performs maintenance can check image processing apparatuses to be repaired by operating a panel of the image processing apparatus 10A, for example.

Fourth Exemplary Embodiment

Hereinafter, a configuration of a data processing program which are readable using a management apparatus 20 and an image processing apparatus 10 will be described with reference to memory maps shown in FIGS. 24 and 25. Note that the data processing program includes a program used to execute the request processing method described above with reference to the foregoing flowcharts.

FIG. 24 is a diagram illustrating a memory map of a storage medium which stores various data processing programs which are readable using the image processing apparatus according to a fourth exemplary embodiment of the present invention.

FIG. 25 is a diagram illustrating a memory map of a storage medium which stores various data processing programs which are readable using the management apparatus according to the fourth exemplary embodiment of the present invention.

Note that, although not particularly shown, the storage medium may store therein information on management of program groups stored in the storage medium such as version information and creator information, and information which relies on an OS (Operating System) included in an apparatus of a program-reading side such as icons which are displayed to identify the various programs.

Furthermore, data blocks which belong to the various programs are managed in directories in the storage medium. Moreover, a program used to install the various programs into a computer and a program used to decompress programs which have been compressed and which are to be installed in a computer may be stored in the storage medium.

The functions described with reference to FIGS. 6 to 12, FIGS. 14 to 16, FIG. 18, and FIGS. 20 to 22 may be executed by a host computer by externally installing a program to the host computer. In this case, the present invention is applicable to a case where information groups including programs are supplied to an output device from a storage medium such as a CD-ROM (Compact Disc Read-Only Memory), a flash memory, and a FD (Flexible Disk) or from an external storage medium through a network.

As described above, the storage medium including a program code of software which realizes the functions of the foregoing exemplary embodiments is supplied to the system or the apparatus. It is apparent that the functions of the present invention are realized by reading and executing the program code stored in the storage medium using a computer (or a CPU (Central Processing Unit) or an MPU (Micro Processing Unit)) included in the system or the apparatus.

In this case, the program code read from the storage medium realizes the functions of the present invention, and therefore, the storage medium which stores the program code is included in the present invention.

Accordingly, any program code such as an object code, a program executed using an interpreter, and script data to be supplied to the OS may be employed as long as the program has a function of a program.

Examples of the storage medium used to supply the program include a flexible disk, a hard disk, an optical disc, an MO (magneto-optical disc), a CD-ROM, a CD-R (Compact Disc Readable), a CD-RW (Compact Disc Rewritable), a magnetic tape, a nonvolatile memory card, a ROM (Read-Only Memory), and a DVD (Digital Versatile Disc).

In this case, a program code read from the storage medium realizes the functions of the foregoing exemplary embodiments, and therefore, the storage medium including the program code is included in the present invention.

Another method for supplying the program includes a method for connecting to a web site through the Internet using a browser of a client computer. In this method, a computer program according to the foregoing exemplary embodiments of the present invention or a compressed file having an automated installation function is downloaded into a recording medium such as a hard disk from the web site. Still another method for supplying the program includes a method for dividing the program code of the present invention into a plurality of files and downloading the plurality of files from different web sites. That is, a WWW server and an ftp server which allow a plurality of users to download the program files which realize the function processing of the present invention using a computer are also included in the present invention.

Furthermore, the program according to the present invention may be stored in a storage medium such as a CD-ROM after the program is encrypted, and the program may be supplied to users. Then, key information used to decrypt the encrypted program may be downloaded from a web site through the Internet by users who meet a predetermined condition. The encrypted program may be decrypted by the key information and may be executed so as to be installed in a computer.

In addition, the functions of the foregoing exemplary embodiments are realized not only by executing a computer program read using a computer but also by another method. Example of the other method includes a method for performing a part of or entire processes of the functions using an OS operating in the computer in accordance with an instruction of the program code.

Moreover, it is apparent that the functions of the foregoing exemplary embodiments are realized by writing the program code read from the storage medium into a function expansion board inserted into the computer or a memory included in a function expansion unit connected to the computer, and performing a part of or entire processes of the functions using a CPU, for example, included in the function expansion board or the function expansion unit in accordance with an instruction of the program code.

While the present invention has been described with reference to exemplary embodiments, it is to be understood that the invention is not limited to the disclosed exemplary embodiments. Various modifications (including organic combinations of the foregoing exemplary embodiments) may be made within the scope of the present invention.

Although the various examples and exemplary embodiments of the present invention are described above, it is apparent for those skilled in the art that the spirit and the scope of the present invention are not limited to particular descriptions in this specification.

This application claims the benefit of Japanese Application No. 2007-272758 filed Oct. 19, 2007, which is hereby incorporated by reference herein in its entirety.

What is claimed is:

1. A monitoring system including a plurality of image processing apparatuses and a management apparatus which manages the plurality of image processing apparatuses, each of the plurality of image processing apparatuses having an instruction unit configured to transmit a maintenance request to the management apparatus in response to a user's instruction, comprising:

a first image processing apparatus which is one of the plurality of image processing apparatuses, comprising:
 a first request identifying information issuing unit configured to issue request identifying information in response to the user's instruction when the user's instruction input through the instruction unit included in the first image processing apparatus is detected;
 a first transmission unit configured to transmit a first maintenance request including the request identifying information issued by the first request identifying information issuing unit and apparatus identifying information of the first image processing apparatus to the management apparatus; and
 a notification unit configured to notify a second image processing apparatus which is connected to the first image processing apparatus through a network of the request identifying information; and the second image processing apparatus, comprising:
 a second request identifying information issuing unit configured to issue request identifying information in response to the user's instruction when the user's instruction input through the instruction unit included in the second image processing apparatus is detected;
 a first reception unit configured to receive the request identifying information notified from the notification unit;
 a storing unit configured to store the request identifying information in a storage when the first reception unit receives the request identifying information; and
 a second transmission unit configured to transmit, when the user's instruction input through the instruction unit included in the second image processing apparatus is detected and the request identifying information has been stored in the storage, a second maintenance request including the request identifying information stored in the storage and apparatus identifying information of the second image processing apparatus to the management apparatus without issuance of new request identifying information by the second request identifying information issuing unit,
 wherein the first and the second maintenance requests include the same request identifying information issued by the first request identifying information issuing unit, and
wherein the first and second image processing apparatuses have a print function.

2. The monitoring system according to claim 1, wherein the second image processing apparatus further comprises a display unit configured to display, when the first reception unit receives the request identifying information, a display screen indicating that another image processing apparatus has issued a maintenance request.

3. The monitoring system according to claim 1, wherein the first and second transmission units transmit information on the latest state of the first image processing apparatus and information on the latest state of the second image processing apparatus, respectively, to the management apparatus.

4. The monitoring system according to claim 1, wherein the first image processing apparatus further comprises a group information storage unit configured to store group information used to manage a number of image processing apparatuses among the plurality of image processing apparatuses as a group, and
wherein the notification unit notifies the number of image processing apparatuses managed as the group in accordance with the group information stored in the group information storage unit of the request identifying information.

5. The monitoring system according to claim 1,
wherein the management apparatus further comprising:
a second reception unit configured to receive the request identifying information and the apparatus identifying information from the image processing apparatuses through the network; and
a storage unit configured to store therein the request identifying information and the apparatus identifying information received by the second reception unit by associating them with each other,
wherein when the second reception unit newly received request identifying information and apparatus identifying information, and when the newly received request identifying information is the same as request identifying information which has already been stored in the storage unit, a service person who is dispatched for repairing one of the plurality of image processing apparatuses identified by the apparatus identifying information stored in the storage unit so as to be associated with the request identifying information is dispatched for repairing the another image processing apparatuses identified by the apparatus identifying information received along with the request identifying information newly received by the second reception unit.

6. The monitoring system according to claim 5,
wherein each of the plurality of image processing apparatuses included in the monitoring system further comprising:
a second instruction unit configured to instruct completion of operation performed in accordance with the maintenance request;
a completion information issuing unit configured to issue completion information corresponding to the apparatus identifying information of itself and the request identifying information when an instruction input through the second instruction unit is detected; and
a third transmission unit configured to transmit the completion information to the management apparatus,
wherein in a case where request identifying information corresponding to the completion information has already been stored in the storage unit when the completion information is received from the third transmission unit, the management apparatus determines that maintenance operation performed on at least one of the plurality of image processing apparatuses identified by apparatus identifying information corresponding to the completion information is completed.

7. The monitoring system according to claim 6,
wherein the management apparatus further comprises a determination unit configured to determine whether all of the maintenance operation of the image processing apparatus identified by the apparatus identifying information stored in the storage unit so as to be associated with the request identifying information is completed, and
wherein when the second reception unit newly receives request identifying information and apparatus identifying information, when the newly received request identifying information is the same as the request identifying information which has already been stored in the storage unit, and when the determination unit determines that all the maintenance operation performed on the image processing apparatus identified by the apparatus identifying information stored in the storage unit so as to be associated with the request identifying information is completed, a service person is not dispatched even when a maintenance request identified by the request identifying information newly received using the second reception unit is detected.

8. The monitoring system according to claim 7,
wherein the management apparatus further comprises a deletion instruction transmission unit configured to transmit a deletion instruction of the request identifying information to the first image processing apparatus when the second determination unit determines that all the maintenance operation performed on the image processing apparatus identified by the apparatus identifying information stored so as to be associated with the request identifying information is completed,
wherein the first image processing apparatus further comprises a deletion notification unit configured to notify the second image processing apparatus which has received the request identifying information through the network from the notification unit of the deletion instruction when the first image processing apparatus receives the deletion instruction of the request identifying information from the deletion instruction transmission unit, and
wherein the image processing apparatus which received the deletion instruction deletes the request identifying information in response to the deletion instruction.

9. A method of monitoring a plurality of image processing apparatuses and a management apparatus which manages the plurality of image processing apparatuses, each of the plurality of image processing apparatuses having an instruction unit configured to transmit a maintenance request to the management apparatus in response to a user's instruction, the method comprising:
issuing, from a first image processing apparatus, request identifying information in response to the user's instruction when the user's instruction input through the instruction unit included in the first image processing apparatus is detected;
transmitting a first maintenance request including the issued request identifying information and apparatus identifying information of the first image processing apparatus to the management apparatus;
notifying, by the first image processing apparatus, a second image processing apparatus which is connected to the first image processing apparatus through a network of the request identifying information;
issuing, from the second image processing apparatus, request identifying information in response to the user's instruction when the user's instruction input through the instruction unit included in the second image processing apparatus is detected;
receiving, in the second image processing apparatus, the notified request identifying information;
storing the request identifying information in a storage when the request identifying information is received; and
transmitting a second maintenance request including the received request identifying information stored in the storage and apparatus identifying information of the second image processing apparatus to the management apparatus without issuance of new request identifying information issued from the second image processing apparatus;
wherein the first and the second maintenance requests include the same request identifying information issued by the first image processing apparatus, and wherein the first and second image processing apparatuses have a print function.

10. The method according to claim 9, wherein the second image processing apparatus display, when the request identifying information is received, on a display screen indicating that another image processing apparatus has issued a maintenance request.

11. The method according to claim 9, wherein each of the first and second transmission apparatuses transmits information on the latest state thereof to the management apparatus.

12. The method according to claim 9, wherein the first image processing apparatus stores group information used to manage a number of image processing apparatuses among the plurality of image processing apparatuses as a group, and notifies the number of image processing apparatuses managed as the group in accordance with the stored group information of the request identifying information.

13. The method according to claim 9, the method further comprising:
receiving, in the management apparatus, the request identifying information and the apparatus identifying information from the image processing apparatuses through the network; and
storing, in a storage unit of the management apparatus, the received request identifying information and the apparatus identifying information by associating them with each other,
wherein when request identifying information and apparatus identifying information are newly received, and when the newly received request identifying information is the same as request identifying information which has already been stored in the storage unit, a service person who is dispatched for repairing one of the plurality of image processing apparatuses identified by the apparatus identifying information stored in the storage unit so as to be associated with the request identifying information is dispatched for repairing the another image processing apparatuses identified by the apparatus identifying information received along with the newly received request identifying information.

14. The method according to claim 13, wherein each of the plurality of image processing apparatuses which is included in the monitoring system and which includes a second instruction unit configured to instruct completion of operation performed in accordance with the maintenance request, further comprising:
issuing completion information corresponding to the apparatus identifying information of itself and the request identifying information when an instruction input through the second instruction unit is detected; and
transmitting the completion information to the management apparatus,
wherein in a case where the completion information is received, the management apparatus determines that maintenance operation performed on at least one of the plurality of image processing apparatuses identified by apparatus identifying information corresponding to the completion information is completed.

15. The method according to claim 14, wherein the management apparatus determines whether all of the maintenance operation of the image processing apparatus identified by the apparatus identifying information stored in the storage unit so as to be associated with the request identifying information is completed, and
wherein when the management apparatus newly receives request identifying information and apparatus identifying information, when the newly received request identifying information is the same as request identifying information which has already been stored in the storage unit, and when it is determined that all the maintenance operation performed on the image processing apparatus identified by the apparatus identifying information stored in the storage unit so as to be associated with the request identifying information is completed, a service person is not dispatched even when a maintenance request identified by the newly received request identifying information is detected.

16. The method according to claim 15, wherein the management apparatus transmits a deletion instruction of the request identifying information to the first image processing apparatus when it is determined that all the maintenance operation performed on the image processing apparatus identified by the apparatus identifying information stored so as to be associated with the request identifying information is completed,
wherein the first image processing apparatus notifies the second image processing apparatus which has received the request identifying information through the network of the deletion instruction when the first image processing apparatus receives the deletion instruction of the request identifying information, and
wherein the second image processing apparatus which received the deletion instruction deletes the request identifying information in response to the deletion instruction.

* * * * *